(12) United States Patent
Geng et al.

(10) Patent No.: US 11,051,090 B2
(45) Date of Patent: Jun. 29, 2021

(54) PON CHANNEL ESTABLISHMENT METHOD, ONU, OLT AND SYSTEM

(71) Applicant: ZTE CORPORATION, Guangdong (CN)

(72) Inventors: Dan Geng, Guangdong (CN); Weiliang Zhang, Guangdong (CN); Mingsheng Li, Guangdong (CN); Zhuang Ma, Guangdong (CN); Liquan Yuan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/494,229

(22) PCT Filed: Dec. 20, 2017

(86) PCT No.: PCT/CN2017/117547
§ 371 (c)(1),
(2) Date: Sep. 13, 2019

(87) PCT Pub. No.: WO2018/166263
PCT Pub. Date: Sep. 20, 2018

(65) Prior Publication Data
US 2020/0029138 A1 Jan. 23, 2020

(30) Foreign Application Priority Data
Mar. 14, 2017 (CN) .......................... 201710151423.7

(51) Int. Cl.
*H04J 14/02* (2006.01)
*H04Q 11/00* (2006.01)

(52) U.S. Cl.
CPC ...... *H04Q 11/0067* (2013.01); *H04J 14/0238* (2013.01); *H04Q 2011/0069* (2013.01); *H04Q 2011/0086* (2013.01)

(58) Field of Classification Search
CPC .................................................. H04J 14/0242
See application file for complete search history.

(56) References Cited

U.S. PATENT DOCUMENTS

2008/0304828 A1* 12/2008 Mizutani ............. H04J 14/0246
398/78
2015/0055955 A1 2/2015 Kim et al.
(Continued)

FOREIGN PATENT DOCUMENTS

CN 101321017 A 12/2008
CN 101355387 A 1/2009
(Continued)

OTHER PUBLICATIONS

WIPO, International Search Report dated Jan. 23, 2018.
(Continued)

*Primary Examiner* — Shi K Li
(74) *Attorney, Agent, or Firm* — Li & Cai Intellectual Property (USA) Office

(57) ABSTRACT

A method and a device for establishing channels for PON are disclosed. The method is applied to an ONU side and comprises: sending, after receiving a registration message sent from an OLT, a message responding to the registration message to the OLT, wherein the message responding to the registration message includes first parameter information for defining self uniqueness or includes combined information composed of self-first parameter information and second parameter information configured by the OLT, and the first parameter information and the combined information is used for defining a binding relationship for establishing multiple channels with the OLT; and completing the establishment of channels according to a channel use command sent from the
(Continued)

OLT, wherein the channel use command comprises multiple pieces of channel identification information allocated by the OLT.

12 Claims, 8 Drawing Sheets

(56) References Cited

U.S. PATENT DOCUMENTS

| | | | |
|---|---|---|---|
| 2015/0381306 | A1 | 12/2015 | Wu et al. |
| 2017/0244487 | A1* | 8/2017 | Gao ............... H04B 10/272 |
| 2017/0279941 | A1 | 9/2017 | Zhang et al. |
| 2019/0386743 | A1* | 12/2019 | Yin ............... H04Q 11/00 |

FOREIGN PATENT DOCUMENTS

| | | |
|---|---|---|
| CN | 101998190 A | 3/2011 |
| CN | 102710999 A | 10/2012 |
| CN | 104468405 A | 3/2015 |
| CN | WO 2015197011 A1 | 12/2015 |
| CN | 105743683 A | 7/2016 |
| CN | 106059704 A | 10/2016 |
| CN | 106488345 A | 3/2017 |
| EP | 2840742 A1 | 2/2015 |
| EP | 2866383 A1 | 4/2015 |
| WO | WO 2011/150759 A1 | 4/2015 |
| WO | WO 2015139218 A1 | 9/2015 |

OTHER PUBLICATIONS

China Patent Office, First office action dated May 7, 2020 corresponding to CN Application No. 201710151423.7.
Orange Pan :"Solutions for Coordinated Energy Saving between RAN resources and Network Links" 3GPP TSG SA Meeting#73; SP-160562; Sep. 15, 2016.
Zang Junchao, "Key Technologies of Hybrid PON Based on 10G EPON", Masters Thesis, Nanjing University of Posts and Telecommunications, Feb. 2013.
European Patent Office, Extended European Search Report dated Dec. 21, 2020 corresponding to EP Application No. 17900657.2.
Yuanqiu Luo, Huawei China:"Draft document of G.multi;C 1849" dated Nov. 22, 2011, International Telecommunication Union.

* cited by examiner

PON CHANNEL ESTABLISHMENT METHOD, ONU, OLT AND SYSTEM

CROSS-REFERENCE TO RELATED APPLICATIONS

This is a National Phase Application filed under 35 U.S.C. 371 as a national stage of PCT/CN2017/117547, filed on Dec. 20, 2017, an application claiming the priority of Chinese Patent Application No. 201710151423.7, filed on Mar. 14, 2017, the contents of which are incorporated herein in their entirety by reference.

TECHNICAL FIELD

The present application relates to, but is not limited to, the field of passive optical network (PON) communication, and particularly relates to a PON channel establishment method, an ONU, an OLT and a system.

BACKGROUND

With the development of communication network technology, a large amount of business including voices, data, videos and the like can be transmitted via the network. As a result, requirements on bandwidth are continuously increased, under which context PON was born.

FIG. 1 is a topologic structural diagram of a PON system. As shown in FIG. 1, a PON system usually consists of an optical line terminal (OLT) on an office side, an optical network unit (ONU) on a user side, and an optical distribution network (ODN), and usually adopts a point-to-multipoint network structure. The ODN consists of passive optical components such as a single-mode fiber, an optical splitter, an optical connector, etc., and provides optical transmission media for physical connection between the OLT and the ONU. In order to improve a line rate while saving fiber resources, it is proposed to simultaneously transmit data at multiple wavelengths in one fiber. Downlink data transmission at the same wavelength for different ONUs adopts a time division multiplexing mode, while uplink transmission thereof adopts a time division multiplexing access mode. This is called a wavelength division time division PON system. FIG. 2 is a topological diagram of a wavelength division time division PON system. As shown in FIG. 2, each OLT manages multiple groups of ONUs. At the same uplink wavelength and the same downlink wavelength, a group of ONUs transmit uplink data at the same uplink wavelength, and receive downlink data at the same downlink wavelength. At different uplink wavelengths and different downlink wavelengths, the group of ONUs transmit the uplink data at different uplink wavelengths, and receive the downlink data at different downlink wavelengths.

To enable the ONU to transmit data at a rate greater than a single channel rate, it is proposed that the ONU can support simultaneous transmission and reception of data on (over) multiple groups of channels. All of the ONUs that support channel-binding in the same ODN are of the same type and support plural identical channels, thus the channel-binding of an ONU could be finished without exchange of working channel information of the ONU between the OLT and the ONU. In this mode, the ONUs are of a single type and support fewer application scenarios. To support various types of users in the same ODN, multiple types of ONUs are desired to be operable in the same ODN at the same time, different types of ONUs support different numbers of channels, and, since the number of channels supported by the ONU may be greater than the number of channels that the OLT can support, the OLT needs to command the ONU to operate (work) on the working channels supported by the OLT. Under the above requirements, how the OLT obtains channels supported by the ONU, and how the OLT and the ONU establish plural bound working channels on which the ONU can operate are remained unsolved.

SUMMARY

The following is a summary of the subject matter described in detail in the disclosure. This summary is not intended to limit the scope of the claims.

In an embodiment of the present disclosure, there is provided a PON channel establishment method, an ONU, an OLT and a system which enable the OLT to obtain channels supported by the ONU, and enable the OLT and the ONU to establish plural bound working channels on which the ONU can operate, and which realize that, when multiple types of ONUs operate in the ODN at the same time, the OLT and the ONU establish a proper and flexible binding relationship in which the number of bound channels as well as the bound channels can be flexibly changed.

In a first aspect, the present application provides a method for establishing channels for a passive optical network (PON), the method being applied to an optical network unit (ONU) side, and including:

sending, after receiving a registration message sent from an optical line terminal (OLT), a message responding to the registration message to the OLT, wherein the message responding to the registration message includes first parameter information for identifying self-uniqueness, and the first parameter information for defining (identifying) self-uniqueness is used for defining a binding relationship for establishing plural channels with the OLT; and completing establishment of the channels according to a channel usage command sent from the OLT, the channel usage command including multiple pieces of channel identification information allocated by the OLT.

In an exemplary embodiment, the first parameter information for defining self-uniqueness may include information selected from a group consisting of:

a unique piece of ONU identity information;

a unique piece of serial number information;

different pieces of serial number information corresponding to the respective channels on which the registration message sent from the OLT is intercepted, and a unique piece of ONU identity information; and a unique piece of serial number information and different pieces of channel information corresponding to the respective channels on which the registration message sent from the OLT is intercepted.

In an exemplary embodiment, the step of sending the message responding to the registration message to the OLT may include: sending messages respectively responding to all of the intercepted registration messages to the OLT; and after sending the message responding to the registration message to the OLT, the method may further include:

receiving second parameter information sent from the OLT, the second parameter information including ONU identification information; wherein the second parameter information including the ONU identification information is configured by the OLT according to the messages respectively responding to all of the intercepted registration messages, and the messages respectively responding to all of the intercepted registration messages include the first parameter information for defining self-uniqueness.

In an exemplary embodiment, after sending the message responding to the registration message to the OLT, the method may further include:

sending, after receiving a ranging result message sent from the OLT, a message responding to the ranging result message to the OLT; wherein the message responding to the ranging result message includes the first parameter information for defining self-uniqueness.

In an exemplary embodiment, before completing establishment of the channels according to the channel usage command sent from the OLT, the method may further include:

sending, after receiving a channel capacity message sent from the OLT, a message responding to the channel capacity message to the OLT; wherein the message responding to the channel capacity message includes information about self-channel capacity.

In an exemplary embodiment, the channel usage command includes: channel identification information about plural channels that are operable with the OLT normally (i.e., could operate or work with the OLT normally), the channel identification information being determined by the OLT according to the message responding to the registration message and the message responding to the channel capacity message.

In a second aspect, the present application further provides a method for establishing channels for a passive optical network (PON), the method being applied to an OLT side, and including:

determining, after receiving a message sent from the ONU responding to a registration message, multiple pieces of channel identification information allocated to the ONU; wherein the message responding to the registration message includes first parameter information for determining uniqueness of the ONU, and the first parameter information for determining uniqueness of the ONU is used for defining a binding relationship for establishing plural channels with the OLT; and sending to the ONU the determined multiple pieces of channel identification information allocated to the ONU through a channel usage command, and completing establishment of the plural channels with the ONU.

In an exemplary embodiment, the first parameter information for determining uniqueness of the ONU may include information selected from a group consisting of:

a unique piece of ONU identity information;

a unique piece of serial number information;

different pieces of serial number information corresponding to the respective channels on which the registration message is intercepted by the ONU and a unique piece of ONU identity information; and a unique piece of serial number information, and different pieces of channel information corresponding to the respective channels on which the registration message is intercepted by the ONU.

In an exemplary embodiment, the step of receiving the message sent from the ONU responding to the registration message may include:

receiving messages sent from the ONU respectively responding to all of the intercepted registration messages; and configuring second parameter information including ONU identification information according to messages sent from the ONU respectively responding to all of the intercepted registration messages, the second parameter information comprising ONU identification information; wherein the messages respectively responding to all of the intercepted registration messages include the first parameter information for determining uniqueness of the ONU.

In an exemplary embodiment, before determining the multiple pieces of channel identification information allocated to the ONU, the method may further include:

receiving, after sending a ranging result message to the ONU, a message sent from the ONU responding to the ranging result message; wherein the message responding to the ranging result message includes the first parameter information for determining uniqueness of the ONU.

In an exemplary embodiment, before determining the multiple pieces of channel identification information allocated to the ONU, the method may further include:

receiving, after sending a channel capacity message to the ONU, a message sent from the ONU responding to the channel capacity message; wherein the message responding to the channel capacity message includes information about channel capacity of the ONU.

In an exemplary embodiment, the step of determining multiple pieces of channel identification information allocated to the ONU may include:

determining channel identification information about plural channels that are operable with the ONU normally according to the message responding to the registration message and the message responding to the channel capacity message.

In a third aspect, the present application further provides an ONU, including:

a first communication module configured to send, after receiving a registration message sent from an OLT, a message responding to the registration message to the OLT, wherein the message responding to the registration message includes first parameter information for defining self-uniqueness, and the first parameter information for defining self-uniqueness is used for defining a binding relationship for establishing plural channels with the OLT; and a first establishing module configured to complete establishment of the channels according to a channel usage command sent from the OLT, wherein the channel usage command includes multiple pieces of channel identification information allocated by the OLT.

In an exemplary embodiment, the first parameter information for defining self-uniqueness may include information selected from a group consisting of:

a unique piece of ONU identity information;

a unique piece of serial number information;

different pieces of serial number information corresponding to the respective channels on which the registration message sent from the OLT is intercepted, and a unique piece of ONU identity information; and a unique piece of serial number information and different pieces of channel information corresponding to the respective channels on which the registration message sent from the OLT is intercepted.

In an exemplary embodiment, the first communication module may be configured to send messages respectively responding to all of the intercepted registration messages to the OLT; and the first communication module may be further configured to receive second parameter information sent from the OLT, the second parameter information including ONU identification information; wherein the second parameter information including the ONU identification information is configured by the OLT according to the messages respectively responding to all of the intercepted registration messages, and the messages respectively responding to all of the intercepted registration messages include the first parameter information for defining self-uniqueness.

In an exemplary embodiment, the first communication module may be further configured to send, after receiving a ranging result message sent from the OLT, a message responding to the ranging result message to the OLT; wherein the message responding to the ranging result message includes the first parameter information for defining self-uniqueness.

In an exemplary embodiment, the first communication module may be further configured to send, after receiving a channel capacity message sent from the OLT, a message responding to the channel capacity message to the OLT; wherein the message responding to the channel capacity message includes information about self-channel capacity.

In an exemplary embodiment, the channel usage command may include: channel identification information about plural channels that are operable with the OLT normally, the channel identification information being determined by the OLT according to the message responding to the registration message and the message responding to the channel capacity message.

In a fourth aspect, the application further provides an OLT, including:

a first determining module configured to determine, after receiving a message sent from the ONU responding to a registration message, multiple pieces of channel identification information allocated to the ONU; wherein the message responding to the registration message includes first parameter information for determining uniqueness of the ONU, and the first parameter information for determining uniqueness of the ONU is used for defining a binding relationship for establishing plural channels with the OLT; and a second communication module configured to send to the ONU the determined multiple pieces of channel identification information allocated to the ONU through a channel usage command to complete establishment of the plural channels with the ONU.

In an exemplary embodiment, the first parameter information for determining uniqueness of the ONU may include information selected from a group consisting of:

a unique piece of ONU identity information;

a unique piece of serial number information;

different pieces of serial number information corresponding to the respective channels on which the registration message is intercepted by the ONU and a unique piece of ONU identity information; and a unique piece of serial number information, and different pieces of channel information corresponding to the respective channels on which the registration message is intercepted by the ONU.

In an exemplary embodiment, the second communication module may be configured to receive messages sent from the ONU respectively responding to all of the intercepted registration messages; and the OLT may further include:

a first configuration module configured to configure second parameter information including ONU identification information according to the messages sent from the ONU respectively responding to all of the intercepted registration messages, the second parameter information comprising ONU identification information; wherein the messages respectively responding to all of the intercepted registration messages include the first parameter information for determining uniqueness of the ONU.

In an exemplary embodiment, the second communication module may be further configured to receive, after sending a ranging result message to the ONU, a message sent from the ONU responding to the ranging result message; wherein the message responding to the ranging result message includes the first parameter information for determining uniqueness of the ONU.

In an exemplary embodiment, the second communication module may be further configured to receive, after sending a channel capacity message to the ONU, a message sent from the ONU responding to the channel capacity message; wherein the message responding to the channel capacity message includes information about channel capacity of the ONU.

In an exemplary embodiment, the first determining module may be further configured to determine channel identification information about plural channels that are operable with the ONU normally according to the message responding to the registration message and the message responding to the channel capacity message.

In a fifth aspect, the present application further provides a system for establishing channels for a PON, the system including the ONU according to the third aspect and the OLT according to the fourth aspect.

In a sixth aspect, the present application further provides a method for establishing channels for a PON, the method being applied to an ONU side, and including:

sending, after receiving a registration message sent from an OLT, a message responding to the registration message to the OLT, wherein the message responding to the registration message includes combined information consisting of self-first parameter information and second parameter information configured by the OLT, the combined information being used for defining a binding relationship for establishing plural channels with the OLT;

completing establishment of the channels according to a channel usage command sent from the OLT, the channel usage command including multiple pieces of channel identification information allocated by the OLT.

In an exemplary embodiment, the self-first parameter information and the second parameter information configured by the OLT may include information selected from a group consisting of:

different pieces of serial number information corresponding to the respective channels on which the registration message sent from the OLT is intercepted; and a unique piece of ONU identification information configured by the OLT;

different pieces of serial number information corresponding to the respective channels on which the registration message sent from the OLT is intercepted; and different pieces of ONU identification information corresponding to the respective channels configured by the OLT and a unique piece of ONU identity information;

different pieces of serial number information corresponding to the respective channels on which the registration message sent from the OLT is intercepted and different pieces of channel information corresponding to the respective channels on which the registration message sent from the OLT is intercepted; and a unique piece of ONU identification information configured by the OLT;

a unique piece of serial number information and different pieces of channel information corresponding to the respective channels on which the registration message sent from the OLT is intercepted; and different pieces of ONU identification information corresponding to the respective channels configured by the OLT; and different pieces of channel information corresponding to the respective channels on which the registration message sent from the OLT is intercepted and different pieces of serial number information corresponding to the different pieces of channel information one by one; and different pieces of ONU identification information corresponding to the respective channels configured by the OLT or a unique piece of ONU identification information.

In an exemplary embodiment, before sending the message responding to the registration message to the OLT, the method may further include:

sending a message responding to a first intercepted registration message to the OLT; and receiving the second parameter information sent from the OLT; wherein the second parameter information is configured by the OLT according to the message responding to the first intercepted registration message, and the message responding to the first intercepted registration message includes the self-first parameter information;

the step of sending the message responding to the registration message to the OLT may include:

sending messages respectively responding to all of the intercepted registration messages except the first intercepted registration message, or messages respectively responding to all of the intercepted registration messages, to the OLT.

In an exemplary embodiment, after sending the message responding to the registration message to the OLT, the method may further include:

sending, after receiving a ranging result message sent from the OLT, a message responding to the ranging result message to the OLT; wherein the message responding to the ranging result message includes combined information consisting of the self-first parameter information and the second parameter information configured by the OLT, the combined information being used for defining a binding relationship for establishing plural channels with the OLT.

In an exemplary embodiment, before completing establishment of the channels according to the channel usage command sent from the OLT, the method may further include:

sending, after receiving a channel capacity message sent from the OLT, a message responding to the channel capacity message to the OLT; wherein the message responding to the channel capacity message includes information about self-channel capacity.

In an exemplary embodiment, the channel usage command includes: channel identification information about plural channels that are operable with the OLT normally, the channel identification information being determined by the OLT according to the message responding to the registration message and the message responding to the channel capacity message.

In a seventh aspect, the present application further provides a method for establishing channels for a passive optical network (PON), the method being applied to an OLT side, and including:

determining, after receiving a message sent from the ONU responding to a registration message, multiple pieces of channel identification information allocated to the ONU; wherein the message responding to the registration message includes combined information consisting of the first parameter information of the ONU and the second parameter information configured by itself for the ONU, the combined information being used for defining a binding relationship for establishing plural channels with the OLT;

sending to the ONU the determined multiple pieces of channel identification information allocated to the ONU through a channel usage command, and completing establishment of the channels with the ONU.

In an exemplary embodiment, the first parameter information of the ONU and the second parameter information configured by itself for the ONU may include information selected from a group consisting of:

different pieces of serial number information corresponding to the respective channels on which the ONU has intercepted the registration message; and a unique piece of ONU identification information configured by itself to the ONU;

different pieces of serial number information corresponding to the respective channels on which the ONU has intercepted the registration message; and different pieces of ONU identification information corresponding to the respective channels configured by itself to the ONU and a unique piece of ONU identity information;

different pieces of serial number information corresponding to the respective channels on which the ONU has intercepted the registration message and different pieces of channel information corresponding to the respective channels on which the ONU has intercepted the registration message; and a unique piece of ONU identification information configured by itself to the ONU;

a unique piece of serial number information of the ONU and different pieces of channel information corresponding to the respective channels on which the ONU has intercepted the registration message; and different pieces of ONU identification information corresponding to the respective channels configured by itself to the ONU; and different pieces of channel information corresponding to the respective channels on which the ONU has intercepted the registration message and different pieces of serial number information corresponding to the different pieces of channel information one by one; and different pieces of ONU identification information corresponding to the respective channels configured by itself to the ONU or a unique piece of ONU identification information.

In an exemplary embodiment, before receiving the message sent from the ONU responding to the registration message, the method may further include:

receiving a message sent from the ONU responding to the first intercepted registration message; and configuring the second parameter information according to the message responding to the first intercepted registration message sent from the ONU; wherein the message responding to the first intercepted registration message includes the first parameter information of the ONU;

sending the second parameter information to the ONU;

the step of receiving the message sent from the ONU responding to the registration message may include:

receiving messages respectively responding to all of the intercepted registration messages except the first intercepted registration message, or messages sent from the ONU respectively responding to all of the intercepted registration messages.

In an exemplary embodiment, before determining the multiple pieces of channel identification information allocated to the ONU, the method may further include:

receiving, after sending a ranging result message to the ONU, a message sent from the ONU responding to the ranging result message; wherein the message responding to the ranging result message includes combined information consisting of the first parameter information of the ONU and the second parameter information configured by itself for the ONU, the combined information being used for defining a binding relationship for establishing plural channels with the OLT.

In an exemplary embodiment, before determining the multiple pieces of channel identification information allocated to the ONU, the method may further include:

receiving, after sending a channel capacity message to the ONU, a message sent from the ONU responding to the channel capacity message; wherein the message responding to the channel capacity message includes information about channel capacity of the ONU.

In an exemplary embodiment, the step of determining multiple pieces of channel identification information allocated to the ONU may include:

determining channel identification information about plural channels that are operable with the ONU normally according to the message responding to the registration message and the message responding to the channel capacity message.

In an eighth aspect, the present application further provides an ONU, including:

a third communication module configured to send, after receiving a registration message sent from an OLT, a message responding to the registration message to the OLT, wherein the message responding to the registration message includes combined information consisting of self-first parameter information and second parameter information configured by the OLT, the combined information being used for defining a binding relationship for establishing plural channels with the OLT;

a second establishing module configured to complete establishment of the channels according to a channel usage command sent from the OLT, wherein the channel usage command includes multiple pieces of channel identification information allocated by the OLT.

In an exemplary embodiment, the self-first parameter information and the second parameter information configured by the OLT may include information selected from a group consisting of:

different pieces of serial number information corresponding to the respective channels on which the registration message sent from the OLT is intercepted; and a unique piece of ONU identification information configured by the OLT;

different pieces of serial number information corresponding to the respective channels on which the registration message sent from the OLT is intercepted; and different pieces of ONU identification information corresponding to the respective channels configured by the OLT, and a unique piece of ONU identity information;

different pieces of serial number information corresponding to the respective channels on which the registration message sent from the OLT is intercepted and different pieces of channel information corresponding to the respective channels on which the registration message sent from the OLT is intercepted; and a unique piece of ONU identification information configured by the OLT;

a unique piece of serial number information and different pieces of channel information corresponding to the respective channels on which the registration message sent from the OLT is intercepted; and different pieces of ONU identification information corresponding to the respective channels configured by the OLT; and different pieces of channel information corresponding to the respective channels on which the registration message sent from the OLT is intercepted and different pieces of serial number information corresponding to the different pieces of channel information one by one; and different pieces of ONU identification information corresponding to the respective channels configured by the OLT or a unique piece of ONU identification information.

In an exemplary embodiment, the third communication module may be further configured to send a message responding to a first intercepted registration message to the OLT; and receive the second parameter information sent from the OLT; wherein the second parameter information is configured by the OLT according to the message responding to the first intercepted registration message, and the message responding to the first intercepted registration message includes the self-first parameter information;

the third communication module may be configured to send messages respectively responding to all of the intercepted registration messages except the first intercepted registration message, or messages respectively responding to all of the intercepted registration messages, to the OLT.

In an exemplary embodiment, the third communication module may be further configured to send, after receiving a ranging result message sent from the OLT, a message responding to the ranging result message to the OLT; wherein the message responding to the ranging result message includes combined information consisting of the self-first parameter information and the second parameter information configured by the OLT, the combined information being used for defining a binding relationship for establishing plural channels with the OLT.

In an exemplary embodiment, the third communication module may be further configured to send, after receiving a channel capacity message sent from the OLT, a message responding to the channel capacity message to the OLT; wherein the message responding to the channel capacity message includes information about self-channel capacity.

In an exemplary embodiment, the channel usage command includes: channel identification information about plural channels that are operable with the OLT normally, the channel identification information being determined by the OLT according to the message responding to the registration message and the message responding to the channel capacity message.

In a ninth aspect, the present application further provides an OLT, including:

a second determining module configured to determine, after receiving a message sent from an ONU responding to a registration message, multiple pieces of channel identification information allocated to the ONU; wherein the message responding to the registration message includes combined information consisting of the first parameter information of the ONU and the second parameter information configured by itself for the ONU, the combined information being used for defining a binding relationship for establishing plural channels with the OLT;

a fourth communication module configured to send to the ONU the determined multiple pieces of channel identification information allocated to the ONU through a channel usage command, and complete establishment of the channels with the ONU.

In an exemplary embodiment, the first parameter information of the ONU and the second parameter information configured by itself for the ONU may include information selected from a group consisting of:

different pieces of serial number information corresponding to the respective channels on which the ONU has intercepted the registration message; and a unique piece of ONU identification information configured by itself to the ONU;

different pieces of serial number information corresponding to the respective channels on which the ONU has intercepted the registration message; and different pieces of ONU identification information corresponding to the respective channels configured by itself to the ONU and a unique piece of ONU identity information;

different pieces of serial number information corresponding to the respective channels on which the ONU has intercepted the registration message and different pieces of channel information corresponding to the respective channels on which the ONU has intercepted the registration message; and a unique piece of ONU identification information configured by itself to the ONU;

a unique piece of serial number information of the ONU and different pieces of channel information corresponding to the respective channels on which the ONU has intercepted the registration message; and different pieces of ONU identification information corresponding to the respective channels configured by itself to the ONU; and different pieces of channel information corresponding to the respective channels on which the ONU has intercepted the registration message and different pieces of serial number information corresponding to the different pieces of channel information one by one; and different pieces of ONU identification information corresponding to the respective channels configured by itself to the ONU or a unique piece of ONU identification information.

In an exemplary embodiment, the fourth communication module may be further configured to receive a message sent from the ONU responding to a first intercepted registration message; and the OLT may further include:

a second configuration module configured to configure the second parameter information according to the message responding to the first intercepted registration message sent from the ONU; wherein the message responding to the first intercepted registration message includes the first parameter information of the ONU;

the fourth communication module may be further configured to send the second parameter information to the ONU;

the fourth communication module may be further configured to receive messages sent from the ONU respectively responding to all of the intercepted registration messages except the first intercepted registration message, or messages sent from the ONU respectively responding to all of the intercepted registration messages.

In an exemplary embodiment, the fourth communication module may be further configured to receive, after sending a ranging result message to the ONU, a message sent from the ONU responding to the ranging result message; wherein the message responding to the ranging result message includes combined information consisting of the first parameter information of the ONU and the second parameter information configured by itself for the ONU, the combined information being used for defining a binding relationship for establishing plural channels with the OLT.

In an exemplary embodiment, the fourth communication module may be further configured to receive, after sending a channel capacity message to the ONU, a message sent from the ONU responding to the channel capacity message; wherein the message responding to the channel capacity message includes information about channel capacity of the ONU.

In an exemplary embodiment, the second determining module may be further configured to determine channel identification information about plural channels that are operable with the ONU normally according to the message responding to the registration message and the message responding to the channel capacity message.

In a tenth aspect, the present application further provides a system for establishing channels for a PON, including the ONU according to the eighth aspect and the OLT according to ninth aspect.

Furthermore, the present application further provides a computer readable medium storing a channel establishment program for a PON which, when executed by a processor, implements steps of the method for establishing channels for the PON according to the first, second, sixth or seventh aspect as described above.

In the PON channel establishment method, the ONU, the OLT, and the system provided by the embodiments of the present application, the ONU sends, after receiving a registration message sent from an OLT, a message responding to the registration message to the OLT, wherein the message responding to the registration message includes first parameter information for defining self-uniqueness, and the first parameter information for defining self-uniqueness is used for defining a binding relationship for establishing plural channels with the OLT, or the message responding to the registration message includes combined information consisting of self-first parameter information and second parameter information configured by the OLT, the combined information being used for defining a binding relationship for establishing plural channels with the OLT; and the ONU completes establishment of the channels according to a channel usage command sent from the OLT, the channel usage command including multiple pieces of channel identification information allocated by the OLT. In this way, the OLT obtains plural channels supported by the ONU, and the OLT and the ONU establish plural bound working channels on which the ONU can operate; and when multiple types of ONUs operate in the ODN at the same time, the OLT and the ONU can establish a proper and flexible binding relationship in which the number of bound channels as well as the bound channels can be flexibly changed.

Other aspects will become apparent upon reading and understanding the drawings and detailed description.

DETAILED DESCRIPTION

The technical solutions in the embodiments of the present disclosure will be described clearly and completely below with reference to the accompanying drawings in the embodiments of the present disclosure.

Figure 1:
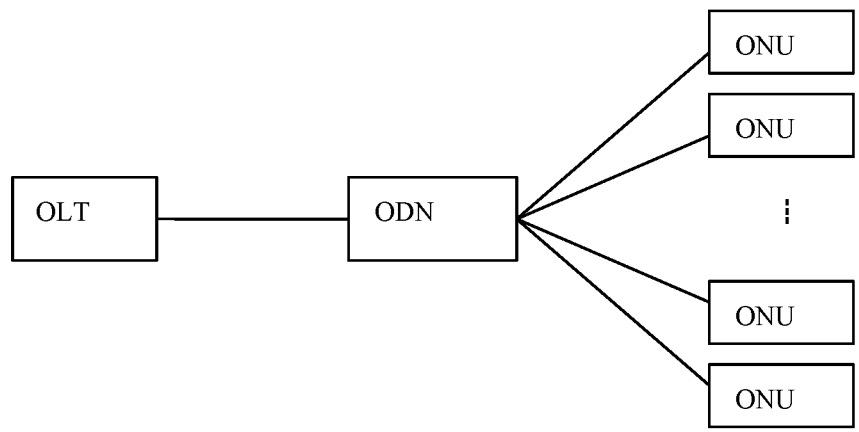
FIG. 1 is a topologic structural diagram of a PON system.
Figure 2:
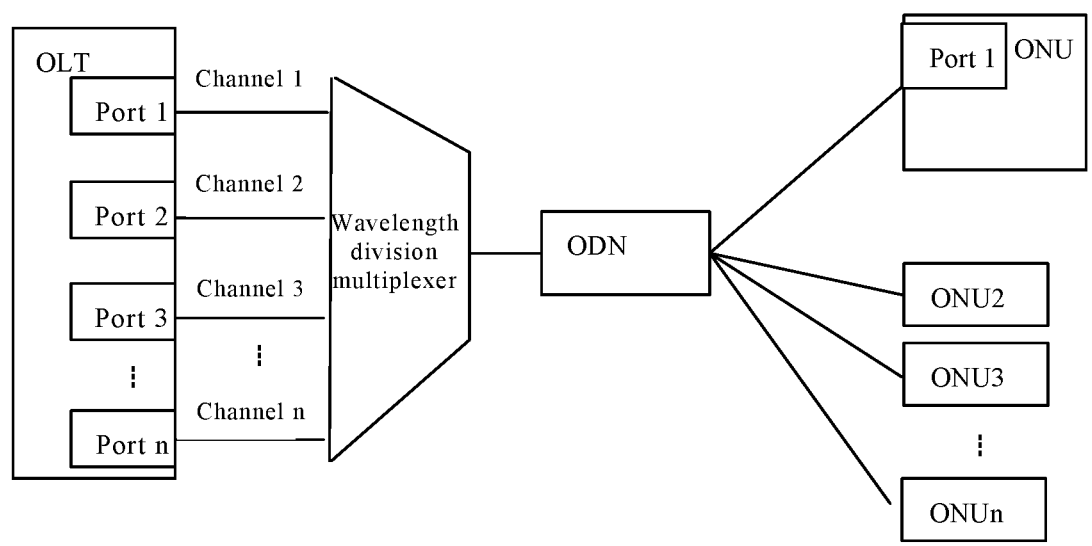
FIG. 2 is a topological diagram of a wavelength division time division PON system.
Figure 3:
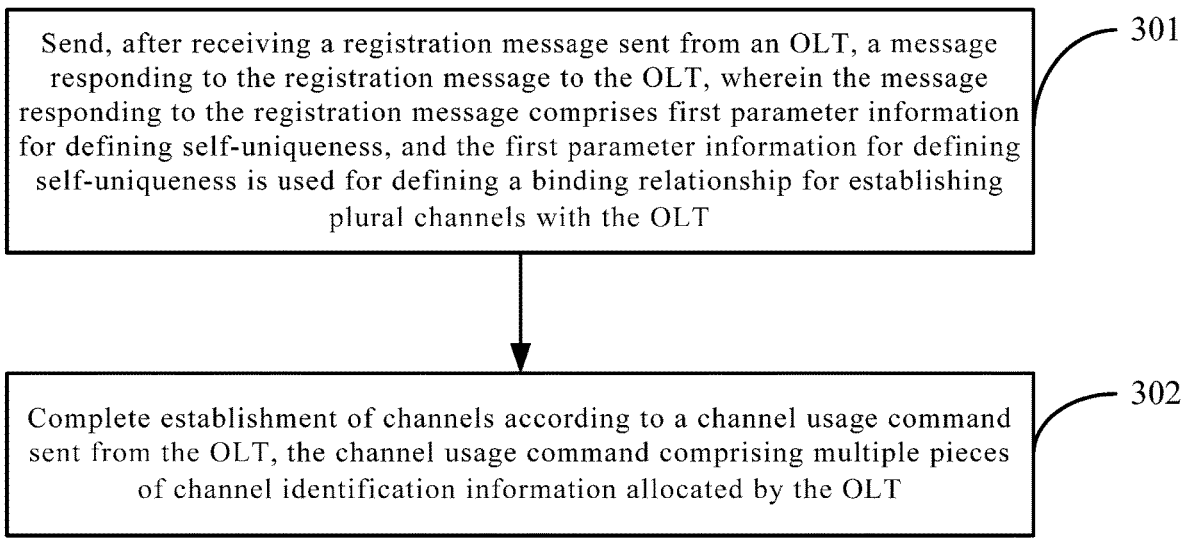
FIG. 3 is a flowchart of a method for establishing channels for a passive optical network according to an embodiment of the present disclosure.

FIG. 3 is a flowchart of a method for establishing channels for a passive optical network according to an embodiment of the present disclosure. As shown in FIG. 3, the method for establishing channels for a passive optical network provided in this embodiment is applied to an ONU that transmit uplink data in a time division multiplexing access mode. Different ONUs on different channels transmit data in a wavelength division multiplexing mode, and one ONU can support data transmission and reception on plural channels simultaneously. The method may include the following steps 301 and 302:

At step 301, after receiving a registration message sent from an OLT, a message responding to the registration message (i.e., a registration message response message) is sent to the OLT, wherein the message responding to the registration message includes first parameter information for defining self-uniqueness, and the first parameter information for defining self-uniqueness is used for defining a binding relationship for establishing plural channels with the OLT.

Exemplarily, after receiving the registration messages sent from the OLT, the ONU directly sends messages respectively responding to all of the registration messages to the OLT. The message responding to the registration message includes first parameter information for defining self-uniqueness, and the first parameter information for defining self-uniqueness is used for defining a binding relationship for establishing plural channels with the OLT (i.e., for establishing plural channels between the UNU and the OLT). Exemplarily, the first parameter information for defining self-uniqueness may include information selected from a group consisting of: a unique piece of ONU identity information; a unique piece of serial number information; different pieces of serial number information corresponding to the respective channels on which the registration message sent from the OLT is intercepted, and a unique piece of ONU identity information; and a unique piece of serial number information and different pieces of channel information corresponding to the respective channels on which the registration message sent from the OLT is intercepted.

Exemplarily, after sending messages respectively responding to all of the registration messages to the OLT, the ONU receives the second parameter information sent from the OLT. The second parameter information is configured by the OLT according to the messages respectively responding to all of the intercepted registration messages, and the messages respectively responding to all of the intercepted registration messages include the first parameter information. The ONU saves the received second parameter information locally, and herein the second parameter information may include: a single piece of ONU identification information allocated by the OLT to the ONU in the entire PON system, or pieces of ONU identification information allocated by the OLT to the ONU on each of the channels, where different channels correspond to different ONU identification information.

Exemplarily, after sending the message responding to the registration message to the OLT, the ONU receives a ranging result message (a message reflecting a ranging result) sent from the OLT, and then sends a message responding to the ranging result message to the OLT; wherein the message responding to the ranging result message includes the first parameter information for defining self-uniqueness.

Exemplarily, after sending a message responding to the ranging result message to the OLT, the ONU receives a channel capacity message from the OLT, and then sends a message responding to the channel capacity message to the OLT, wherein the message responding to the channel capacity message includes information about channel capacity (channel capacity information) of the ONU itself.

At step 302, establishment of the channels is completed according to a channel usage command sent from the OLT, the channel usage command including multiple pieces of channel identification information allocated by the OLT.

The ONU completes establishment of the channels according to the channel usage command sent from the OLT. The channel usage command may include: channel identification information about plural channels that are operable with the OLT normally, the channel identification information being determined by the OLT according to the message responding to the registration message; or, channel identification information about plural channels that are operable with the OLT normally, the channel identification information being determined by the OLT according to the message responding to the registration message and the message responding to the channel capacity message. That is, the ONU completes binding of the channels determined with the OLT according to the channel usage command, maintains the optical transceivers corresponding to the channels that are operable, and turns off the optical transceivers corresponding to the channels that are not allowed by the OLT to operate.

In the method for establishing channels for a passive optical network provided by the embodiment, the ONU sends, after receiving a registration message sent from an OLT, a message responding to the registration message to the OLT, wherein the message responding to the registration message includes first parameter information for defining self-uniqueness, and the first parameter information for defining self-uniqueness is used for defining a binding relationship for establishing plural channels with the OLT; and the ONU completes establishment of the channels according to a channel usage command sent from the OLT, the channel usage command including multiple pieces of channel identification information allocated by the OLT. In this way, the OLT obtains plural channels supported by the ONU, and the OLT and the ONU establish plural bound working channels on which the ONU can operate; and when multiple types of ONUs operate in the ODN at the same time, the OLT and the ONU can establish a proper and flexible binding relationship in which the number of bound channels as well as the bound channels can be flexibly changed.

Figure 4:
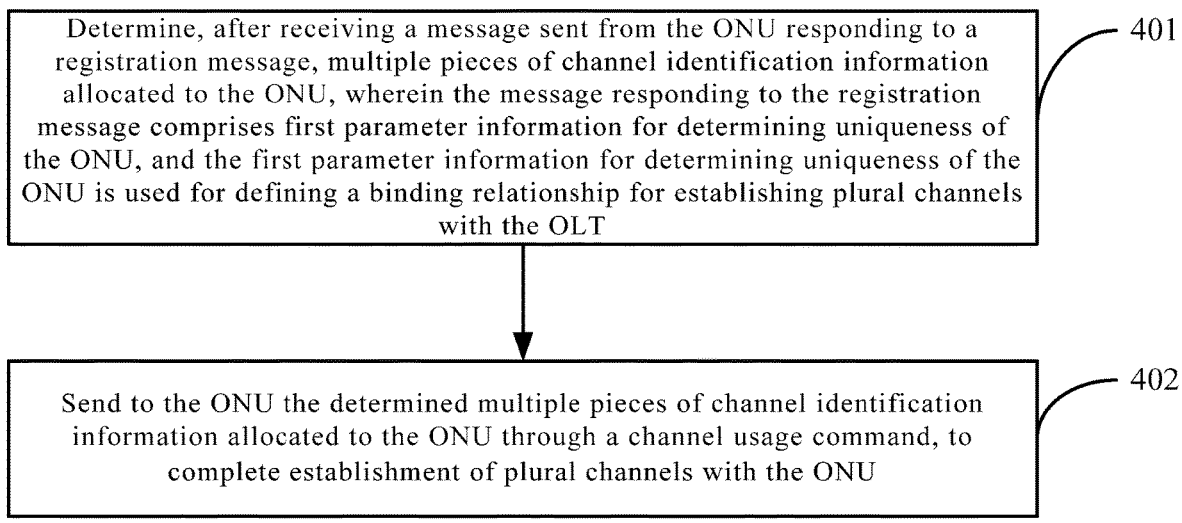
FIG. 4 is a flowchart of another method for establishing channels for a passive optical network according to an embodiment of the present disclosure.

FIG. 4 is a flowchart of another method for establishing channels for a passive optical network according to an embodiment of the present disclosure. As shown in FIG. 4, the method for establishing channels for a passive optical network provided in this embodiment is applied to an OLT. The OLT includes plural ports, each of which corresponding to one wavelength channel. Each channel uses one downlink wavelength and one uplink wavelength, and on each channel, one OLT port manages a group of ONUs. The method may include the following steps 401 and 402:

At step 401, after receiving a message sent from the ONU responding to a registration message, multiple pieces of channel identification information allocated to the ONU are determined. The message responding to the registration message includes first parameter information for determining uniqueness of the ONU, and the first parameter information for determining uniqueness of the ONU is used for defining a binding relationship for establishing plural channels with the OLT.

Exemplarily, after sending the registration message to the ONU, the OLT directly receives messages, fed back by the ONU, responding to all of the intercepted registration messages, wherein the message responding to the registration message includes first parameter information for determining uniqueness of the ONU, and the first parameter information for determining uniqueness of the ONU may include information selected from a group consisting of: a unique piece of ONU identity information; a unique piece of serial number information; different pieces of serial number information corresponding to the respective channels on which the registration message is intercepted by the ONU and a unique piece of ONU identity information; and a unique piece of serial number information and different pieces of channel information corresponding to the respective channels on which the registration message is intercepted by the ONU.

Exemplarily, after receiving the messages sent from the ONU respectively responding to all of the intercepted registration messages, the OLT configures the second parameter information including the ONU identification information according to the messages respectively responding to all of the intercepted registration messages, and sends the second parameter information including the ONU identification information to the ONU. Herein, the second parameter information including the ONU identification information may include: a single piece of ONU identification information allocated by the OLT to the ONU in the entire PON system, or pieces of ONU identification information allocated by the OLT to the ONU on each of the channels, where different channels correspond to different ONU identification information.

The OLT may determine, according to the first parameter information for defining the uniqueness of the ONU in the messages fed back by the ONU responding to all of the intercepted registration messages, plural channels that are operable with the ONU normally, that is, determine on which channels a certain ONU can operate at the same time.

Exemplarily, before determining the multiple pieces of channel identification information allocated to the ONU and after sending a ranging result message to the ONU, the OLT receives a message sent from the ONU responding to the ranging result message. The message responding to the ranging result message includes the first parameter information for determining uniqueness of the ONU.

In addition, the OLT may choose to perform ranging on all channels supported by the ONU at the same time, and send the ranging results to the ONU; or the OLT may also calculate the ranging results of the ONU on other channels, and send the ranging results to the ONU; or the OLT does not choose to perform ranging on the ONU, and the ONU uses the same ranging result on all channels.

Exemplarily, before determining the multiple pieces of channel identification information allocated to the ONU and after sending the channel capacity message to the ONU, the OLT receives a message sent from the ONU responding to the channel capacity message, wherein the message responding to the channel capacity message includes information about channel capacity of the ONU.

Exemplarily, the step that the OLT determines the multiple pieces of channel identification information allocated to the ONU may include: determining, by the OLT, channel identification information about plural channels that are operable with the ONU normally according to the message responding to the registration message and the message responding to the channel capacity message.

At step 402, the determined multiple pieces of channel identification information allocated to the ONU are sent to the ONU through a channel usage command, and establishment of the plural channels with the ONU is completed.

The OLT sends the determined multiple pieces of channel identification information allocated to the ONU through a channel usage command to the ONU, and completes establishment of the plural channels with the ONU. That is, the OLT uses the channel usage command to complete binding of multiple channels between the ONU and the OLT, and commands the ONU to maintain the optical transceivers corresponding to plural operable channels, and turns off the transceivers corresponding to the working channels that are not allowed to operate.

In the method for establishing channels for a passive optical network provided by the embodiment, after receiving a message sent from the ONU responding to a registration message, the OLT determines multiple pieces of channel identification information allocated to the ONU, wherein the message responding to the registration message includes first parameter information for determining uniqueness of the ONU, and the first parameter information for determining uniqueness of the ONU is used for defining a binding relationship for establishing plural channels with the ONU; and the OLT sends to the ONU the determined multiple pieces of channel identification information allocated to the ONU through a channel usage command to complete establishment of the plural channels with the ONU. In this way, the OLT obtains plural channels supported by the ONU, and the OLT and the ONU establish plural bound working channels on which the ONU can operate; and when multiple types of ONUs operate in the ODN at the same time, the OLT and the ONU can establish a proper and flexible binding relationship in which the number of bound channels as well as the bound channels can be flexibly changed.

Figure 5:
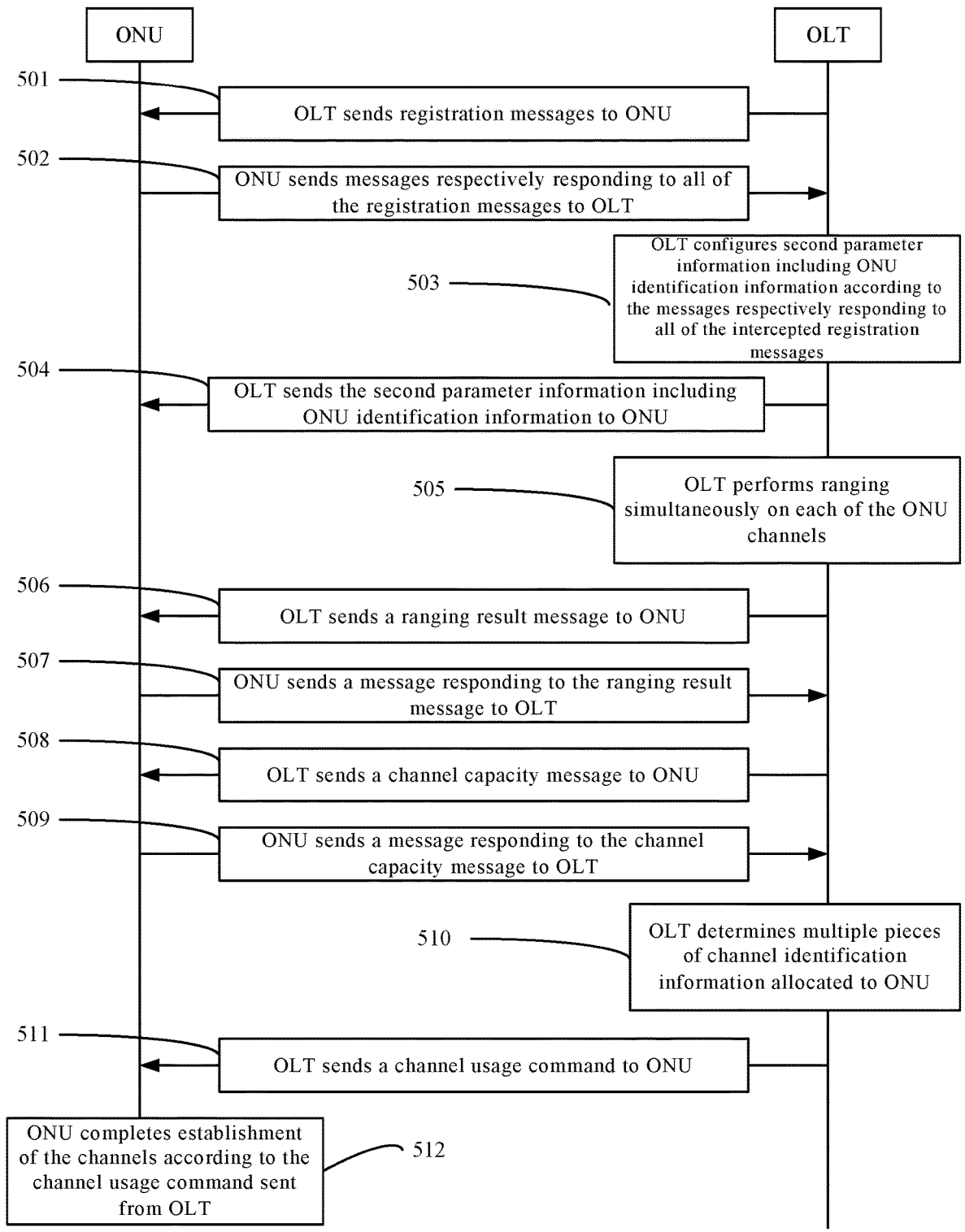
FIG. 5 is an exemplary flowchart of a method for establishing channels for a passive optical network according to an embodiment of the present disclosure.

FIG. 5 is an exemplary flowchart of a method for establishing channels for a passive optical network according to an embodiment of the present disclosure. As shown in FIG. 5, the method for establishing channels for a passive optical network provided in this embodiment is applied to an interaction between the ONU and the OLT. The OLT includes plural ports, each of which corresponding to one channel. Each channel uses one downlink wavelength and one uplink wavelength, and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural channels simultaneously. The method may include the following steps 501-512:

At step 501, the OLT sends registration messages to the ONU.

The OLT sends registration messages to the ONU, and the ONU receives (intercepts) the registration messages sent from the OLT.

At step 502, the ONU sends messages respectively responding to all of the registration messages to the OLT.

The ONU sends messages respectively responding to all of the registration messages to the OLT, and the OLT receives the messages sent from the ONU respectively responding to all of the registration messages. The messages responding to the registration message include the first parameter information for determining uniqueness of the ONU. For explanation of the first parameter information for determining uniqueness of the ONU, reference may be made to the foregoing embodiments, and details are not described herein.

At step 503, the OLT configures second parameter information including ONU identification information according to the messages respectively responding to all of the intercepted (intercepted by the ONU) registration messages.

For explanation of the second parameter information including ONU identification information, reference may be made to the foregoing embodiments, and details are not described herein.

At step 504, the OLT sends the second parameter information including ONU identification information to the ONU.

The OLT sends the second parameter information including ONU identification information to the ONU, and the ONU receives the second parameter information including ONU identification information sent from the OLT.

At step 505, the OLT performs ranging on each of the ONU channels at the same time.

The OLT performs ranging simultaneously on each of the ONU channels that sents a registration responding message (i.e., message responding to the registration message), and obtains the ranging result of each channel.

At step 506, the OLT sends a ranging result message to the ONU.

the OLT carries the ranging results in the ranging result message and sends the ranging result message to the ONU, and the ONU receives the ranging result message sent from the OLT carrying the ranging results.

At step 507, the ONU sends a message responding to the ranging result message to the OLT.

The ONU sends a message responding to the ranging result message to the OLT, and the OLT receives the message sent from the ONU responding to the ranging result message. The message responding to the ranging result message carries the first parameter information for determining uniqueness of the ONU in the step 502.

At step 508, the OLT sends a channel capacity message to the ONU.

The OLT sends a channel capacity message to the ONU, and the ONU receives the channel capacity message sent from the OLT. The channel capacity message is used to obtain a channel capacity of the ONU, the channel capacity being information about one or more channels on which the ONU is capable of sending and receiving data. Each piece of channel information includes information about an uplink wavelength and information about a downlink wavelength.

At step 509, the ONU sends a message responding to the channel capacity message to the OLT.

The ONU sends a message responding to the channel capacity message to the OLT, and the OLT receives the message sent from the ONU responding to the channel capacity message. The message responding to the channel capacity message includes the information about channel capacity of the ONU itself.

At step 510, the OLT determines multiple pieces of channel identification information allocated to the ONU.

The OLT determines, according to the first parameter information for determining uniqueness of the ONU in the messages sent from the ONU respectively responding to all of the registration messages, multiple pieces of channel identification information allocated to the ONU, that is, determines multiple channels that are operable with the ONU normally. Alternatively, the OLT determines, according to the first parameter information for determining uniqueness of the ONU in the messages sent from the ONU respectively responding to all of the registration messages, and the information about channel capacity of the ONU itself in the message responding to the channel capacity message, multiple pieces of channel identification information allocated to the ONU, that is, determines multiple channels that are operable with the ONU normally.

At step 511, the OLT sends a channel usage command to the ONU.

The OLT sends, through the channel usage command, the multiple channels that are determined to be operable with the ONU normally to the ONU, and the ONU receives the channel usage command sent from the OLT.

At step 512, the ONU completes establishment of the channels according to the channel usage command sent from the OLT.

The ONU completes binding of the multiple channels determined with the OLT according to the channel usage command, maintains the optical transceivers corresponding to the multiple channels that are operable, and turns off the optical transceivers corresponding to the channels that are not allowed by the OLT to operate.

In the method for establishing channels for a passive optical network provided by the embodiment, the OLT obtains plural channels supported by the ONU, and the OLT and the ONU establish plural bound working channels on which the ONU can operate; and when multiple types of ONUs operate in the ODN at the same time, the OLT and the ONU can establish a proper and flexible binding relationship in which the number of bound channels as well as the bound channels can be flexibly changed.

Plural scenarios are exemplarily explained below.

Scenario I

In this scenario, the OLT includes plural ports, each of which corresponding to one wavelength channel. Each channel uses one downlink wavelength and one uplink wavelength, and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously. Each of the ONUs that support binding of multiple channels stores multiple pieces of serial number information, and each of the channels corresponds to a serial number different from each other.

Each of the ONUs stores a unique piece of ONU identity information for defining uniqueness of the ONU as a communication device. The OLT can identify whether the ONUs with different serial numbers on multiple channels are the same one according to the unique piece of ONU identity information of each ONU, and obtain the pieces of channel information supported by one ONU to complete the channel binding.

The OLT and the ONU establish a binding channel by the following steps:

At step 1 of Scenario I: in the current PON system, the ONU turns on optical receivers of all channels supported by the ONU to intercept downlink registration messages; and turns on optical transmitters corresponding to the channels on which a registration message is intercepted, to send registration responding messages to the OLT. Each registration responding message includes different pieces of serial number information of the respective channels of the ONU (i.e., information about serial number of the corresponding channel) and a unique piece of ONU identity information. The ONU sends the registration responding messages according to the above steps on all of the supported channels that have intercepted the registration message.

At step 2 of Scenario I: the OLT receives the registration responding message sent from the ONU, extracts the pieces of serial number information and the unique piece of ONU identity information of the ONU, and allocates the ONU identification information of the current channel in the current PON system to the ONU, where on different channels, the ONU is allocated with different pieces of ONU identification information.

At step 3 of Scenario I: the OLT performs ranging simultaneously on each of the channels on which the ONU sends the registration responding message respectively, and sends the ranging result of each channel to the ONU on the corresponding channel.

At step 4 of Scenario I: according to the same unique piece of ONU identity information in the registration responding messages sent from the ONU on different channels, the OLT may associate different channels of ONU with the same ONU, and obtain channel information about all channels supported by the ONU. The OLT sends a message to the ONU to notify on which wavelength channels the ONU can operate at the same time.

At step 5 of Scenario I: after receiving the message sent from the OLT in step 4, the ONU completes binding of the channels according to the operable wavelength channels in the message. The ONU maintains optical transceivers of the operable working channels, and turns off transceivers of the working channels that are not allowed to operate.

Scenario II

In this scenario, the OLT includes plural ports, each of which corresponding to one wavelength channel. Each channel uses one downlink wavelength and one uplink wavelength, and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously, and a unique piece of serial number information is stored at each ONU that supports binding of multiple channels.

The OLT and the ONU establish binding channels by the following steps:

At step 1 of Scenario II: in the current PON system, the ONU turns on optical receivers of all channels supported by the ONU to intercept downlink registration messages; and turns on optical transmitters corresponding to the channels on which a registration message is intercepted, to send registration responding messages. Each registration responding message includes a unique piece of serial number information of the ONU and a piece of channel identification information of the current channel (information about channel identification of the current channel), and the ONU sends the registration responding messages on all supported wavelength channels in the manner as described above.

At step 2 of Scenario II: the OLT receives the registration responding message sent from the ONU in step 1 of scenario II, extracts the unique piece of serial number information of the ONU and the piece of channel identification information, and allocates the ONU identification information of the current channel in the current PON system to the ONU.

At step 3 of Scenario II: the OLT performs ranging simultaneously on each of the channels on which the ONU sends the registration responding message respectively, and sends the ranging result of each channel to the ONU on the corresponding channel.

At step 4 of Scenario II: according to the same unique piece of ONU serial number information in the registration responding messages sent from the ONU on different channels, the OLT may associate different channels of ONU with the same ONU, and obtain channel information about all channels supported by the ONU. The OLT sends a message to the ONU to notify on which wavelength channels the ONU can operate at the same time.

At step 5 of Scenario II: after receiving the message sent from the OLT in step 4 of Scenario II, the ONU completes binding of wavelengths (wavelength bonding) according to the operable wavelength channels indicated in the message. The ONU maintains optical transceivers of the operable working channels, and turns off transceivers of the working channels that are not allowed to operate.

Scenario III

In this scenario, the OLT includes plural ports, each of which corresponding to one wavelength channel. Each channel uses one downlink wavelength and one uplink wavelength, and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously, and a unique piece or multiple pieces of serial number information are stored at each ONU that supports binding of multiple channels. If multiple pieces of serial number information are stored, each channel corresponds to one piece of serial number information.

The OLT and the ONU establish binding channels by the following steps:

At step 1 of Scenario III: in the current PON system, the ONU turns on optical receivers of all channels supported by the ONU to intercept downlink registration messages; and turns on optical transmitters corresponding to the channels on which a registration message is intercepted, to send registration responding messages. Each registration responding message includes serial number information of the ONU, and the ONU sends the registration responding messages on all supported wavelength channels in the manner as described above.

At step 2 of Scenario III: the OLT receives the registration responding message sent from the ONU in step 1 of scenario III, extracts the serial number information of the ONU, and allocates the ONU identification information in the current PON system to the ONU.

At step 3 of Scenario III: the OLT performs ranging simultaneously on each of the channels on which the ONU sends the registration responding message respectively, and sends the ranging result of each channel to the ONU on the corresponding channel.

At step 4 of Scenario III: the OLT inquiries the ONU wavelength channel capacity, that is, the OLT sends a wavelength channel capacity inquiry message to the ONU.

At step 5 of Scenario III: the ONU reports its own wavelength channel capacity to the OLT. The wavelength channel capacity is information about one or more wavelength channels on which the ONU is capable of sending and receiving data. Each piece of wavelength channel information includes information about an uplink wavelength and information about a downlink wavelength.

At step 6 of Scenario III: after receiving the wavelength channel capacity of the ONU, the OLT may associate different channels of ONU with the same ONU, and obtain channel information about all channels supported by the ONU. The OLT sends a message to the ONU to notify on which wavelength channels the ONU can operate at the same time.

At step 7 of Scenario III: after receiving the message about the wavelength channels on which the ONU can operate sent from the OLT in step 6 of Scenario III, the ONU maintains or turns on optical module transceivers corresponding to the above operable channels, keeps the optical module transceivers corresponding to other channels closed or turns off them, and replies to the OLT that the ONU agrees to operate on the above working channels.

Figure 6:
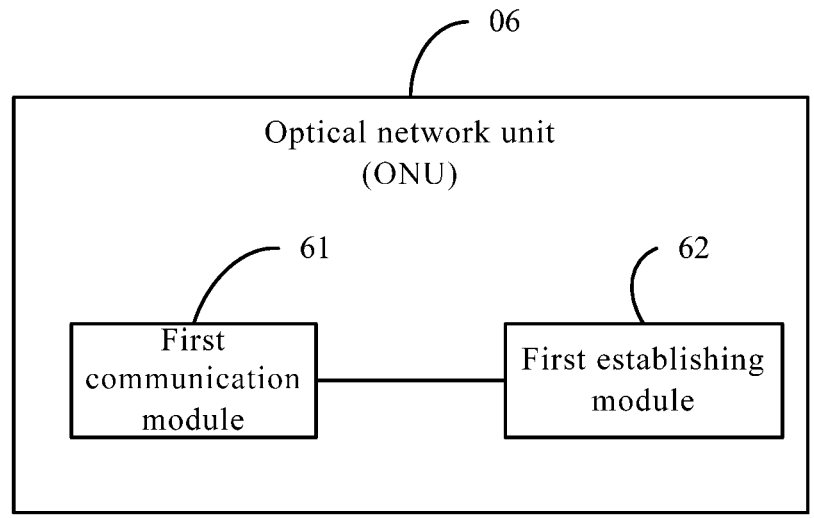
FIG. 6 is a schematic structural diagram of an optical network unit according to an embodiment of the present disclosure.

FIG. 6 is a schematic structural diagram of an optical network unit according to an embodiment of the present disclosure. As shown in FIG. 6, the optical network unit (ONU) 06 provided in this embodiment includes: a first communication module 61, and a first establishing module 62; wherein the first communication module 61 is configured to send, after receiving a registration message sent from an OLT, a message responding to the registration message to the OLT, wherein the message responding to the registration message includes first parameter information for defining self-uniqueness, and the first parameter information for defining self-uniqueness is used for defining a binding relationship for establishing plural channels with the OLT; and the first establishing module 62 is configured to complete establishment of the channels according to a channel usage command sent from the OLT, wherein the channel usage command includes multiple pieces of channel identification information allocated by the OLT.

Exemplarily, the first parameter information for defining self-uniqueness may include information selected from a group consisting of:
  a unique piece of ONU identity information;
  a unique piece of serial number information;
  different pieces of serial number information corresponding to the respective channels on which the registration message sent from the OLT is intercepted, and a unique piece of ONU identity information; and
  a unique piece of serial number information and different pieces of channel information corresponding to the respective channels on which the registration message sent from the OLT is intercepted.

Exemplarily, the first communication module 61 may be configured to send messages respectively responding to all of the intercepted registration messages to the OLT; and the first communication module 61 may be further configured to receive second parameter information sent from the OLT, the second parameter information including ONU identification information; wherein the second parameter information including the ONU identification information is configured by the OLT according to the messages respectively responding to all of the intercepted registration messages, and the messages respectively responding to all of the intercepted registration messages include the first parameter information for defining self-uniqueness.

Exemplarily, the first communication module 61 may be further configured to send, after receiving a ranging result message sent from the OLT, a message responding to the ranging result message to the OLT; wherein the message responding to the ranging result message includes the first parameter information for defining self-uniqueness.

Exemplarily, the first communication module 61 may be further configured to send, after receiving a channel capacity message sent from the OLT, a message responding to the channel capacity message to the OLT; wherein the message responding to the channel capacity message includes information about self-channel capacity.

Exemplarily, the channel usage command may include: channel identification information about plural channels that are operable with the OLT normally, the channel identification information being determined by the OLT according to the message responding to the registration message and the message responding to the channel capacity message.

The ONU of this embodiment may be used to implement the technical solution of the method embodiment as shown in FIG. 3. The implementation principle and technical effects are similar and details are not repeated herein again.

In practical applications, the first communication module 61 and the first establishing module 62 may be each implemented by a central processing unit (CPU), a micro processor unit (MPU), a digital signal processor (DSP) or a field programmable gate array (FPGA) in the ONU or the like.

Figure 7:
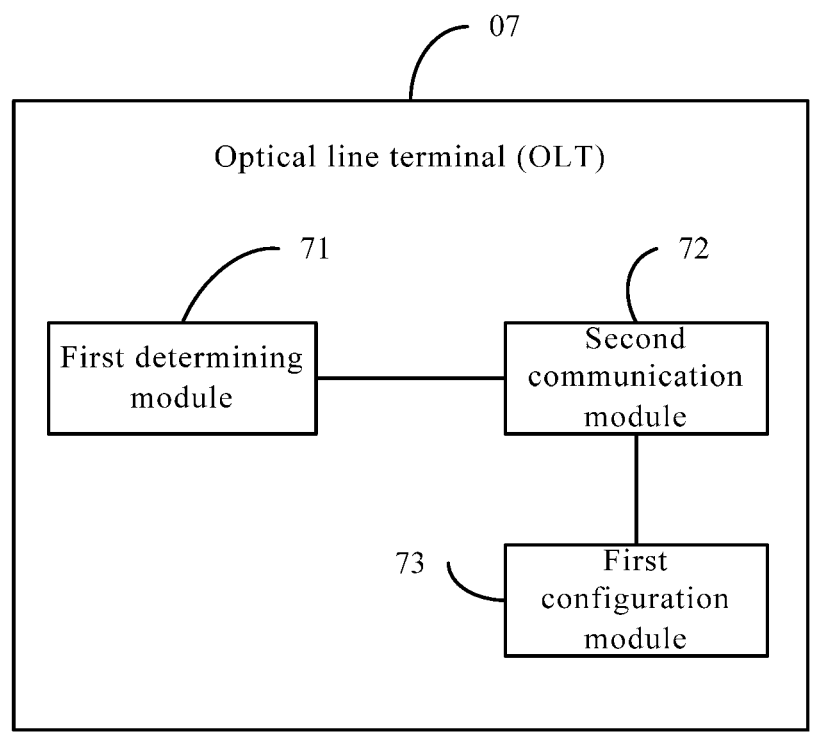
FIG. 7 is a schematic structural diagram of an optical line terminal according to an embodiment of the present disclosure.

FIG. 7 is a schematic structural diagram of an optical line terminal according to an embodiment of the present disclosure. As shown in FIG. 7, an optical line terminal (OLT) 07 is provided in this embodiment, including: a first determining module 71, and a second communication module 72; wherein the first determining module 71 is configured to determine, after receiving a message sent from the ONU responding to a registration message, multiple pieces of channel identification information allocated to the ONU; wherein the message responding to the registration message includes first parameter information for determining uniqueness of the ONU, and the first parameter information for determining uniqueness of the ONU is used for defining a binding relationship for establishing plural channels with the OLT; and the second communication module 72 is configured to send to the ONU the determined multiple pieces of channel identification information allocated to the ONU through a channel usage command, and to complete establishment of the plural channels with the ONU.

Exemplarily, the first parameter information for determining uniqueness of the ONU may include information selected from a group consisting of:
  a unique piece of ONU identity information;
  a unique piece of serial number information;

different pieces of serial number information corresponding to the respective channels on which the registration message is intercepted by the ONU and a unique piece of ONU identity information; and a unique piece of serial number information and different pieces of channel information corresponding to the respective channels on which the registration message is intercepted by the ONU.

Exemplarily, the second communication module 72 may be configured to receive messages sent from the ONU respectively responding to all of the intercepted registration messages;

the OLT 07 may further include: a first configuration module 73; wherein the first configuration module 73 is configured to configure second parameter information including ONU identification information according to the messages sent from the ONU respectively responding to all of the intercepted registration messages; wherein the messages respectively responding to all of the intercepted registration messages include the first parameter information for determining uniqueness of the ONU.

Exemplarily, the second communication module 72 may be further configured to receive, after sending a ranging result message to the ONU, a message sent from the ONU responding to the ranging result message; wherein the message responding to the ranging result message includes the first parameter information for determining uniqueness of the ONU.

Exemplarily, the second communication module 72 may be further configured to receive, after sending a channel capacity message to the ONU, a message sent from the ONU responding to the channel capacity message; wherein the message responding to the channel capacity message includes information about channel capacity of the ONU.

Exemplarily, the first determining module 71 may be further configured to determine channel identification information about plural channels that are operable with the ONU normally according to the message responding to the registration message and the message responding to the channel capacity message.

The OLT of this embodiment may be used to implement the technical solution of the method embodiment as shown in FIG. 4. The implementation principle and technical effects are similar and details are not repeated herein again.

In practical applications, all of the first determining module 71, the second communication module 72 and the first configuration module 73 may be implemented by a central processing unit (CPU), a micro processor unit (MPU), a digital signal processor (DSP) or a field programmable gate array (FPGA) in the OLT or the like.

Figure 8:
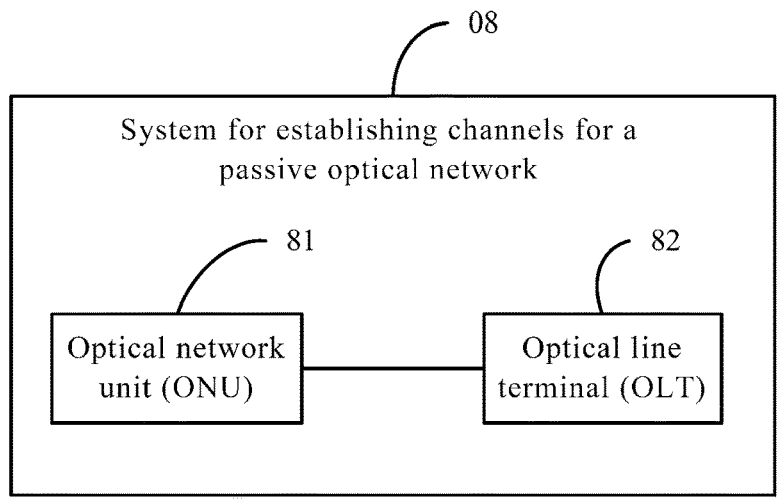
FIG. 8 is a schematic structural diagram of a system for establishing channels for a passive optical network according to an embodiment of the present disclosure.

FIG. 8 is a schematic structural diagram of a system for establishing channels for a passive optical network according to an embodiment of the present disclosure. As shown in FIG. 8, a system 08 for establishing channels for a passive optical network is provided in this embodiment, including an ONU 81 and an OLT 82; wherein the ONU 81 may be an ONU in the embodiment shown in FIG. 6; and the OLT 82 may be an OLT in the embodiment shown in FIG. 7.

Figure 9:
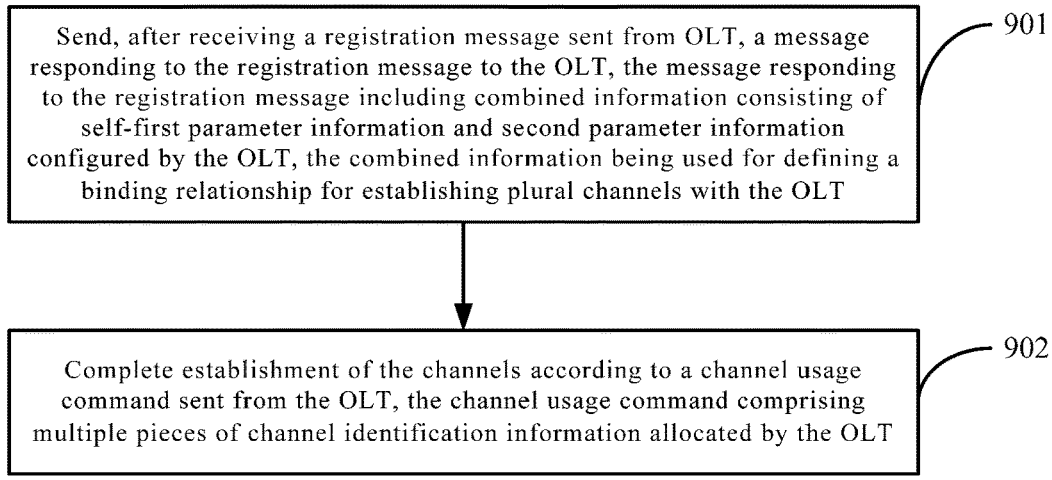
FIG. 9 is a flowchart of another method for establishing channels for a passive optical network according to an embodiment of the present disclosure.

FIG. 9 is a flowchart of another method for establishing channels for a passive optical network according to an embodiment of the present disclosure. As shown in FIG. 9, the method for establishing channels for a passive optical network provided in this embodiment is applied to an ONU. The ONU transmits uplink data in a time division multiplexing access mode, and different ONUs on different channels transmit data in a wavelength division multiplexing mode. One ONU can support data transmission and reception on plural channels simultaneously. The method may include the following steps:

At step 901, after receiving a registration message sent from an OLT, a message responding to the registration message is sent to the OLT. The message responding to the registration message includes combined information consisting of self-first parameter information and second parameter information configured by the OLT, the combined information being used for defining a binding relationship for establishing plural channels with the OLT.

Exemplarily, after receiving the registration message sent from the OLT, the ONU sends messages responding to the first intercepted registration message to the OLT. The message responding to the first intercepted registration message includes the first parameter information of the ONU itself. The first parameter information of the ONU itself here may include at least one of: different pieces of serial number information corresponding to the respective channels on which the registration message sent from the OLT is intercepted or a unique piece of serial number information, and different pieces of channel information corresponding to the respective channels on which the registration message sent from the OLT is intercepted.

Next, the ONU receives the second parameter information configured and sent from the OLT. The second parameter information is configured by the OLT according to the message responding to the first intercepted registration message. The second parameter information here may include at least one of: a unique piece of ONU identification information, and different pieces of ONU identification information corresponding to the respective channels.

Afterwards, the ONU sends messages respectively responding to all of the intercepted registration messages except the first intercepted registration message, or messages respectively responding to all of the intercepted registration messages, to the OLT. The messages responding to the registration messages include combined information consisting of the self-first parameter information and the second parameter information configured by the OLT, the combined information being used for defining a binding relationship for establishing plural channels with the OLT. Here, the combined information consisting of the first parameter information of the ONU itself and the second parameter information configured by the OLT may include: combined information consisting of different pieces of serial number information corresponding to the respective channels themselves on which the registration message sent from the OLT is intercepted, and a unique piece of ONU identification information configured by the OLT; or, combined information consisting of different pieces of serial number information corresponding to the respective channels on which the registration message sent from the OLT is intercepted, different pieces of ONU identification information corresponding to the respective channels configured by the OLT, and a unique piece of ONU identity information; or, combined information consisting of different pieces of serial number information corresponding to the respective channels themselves on which the registration message sent from the OLT is intercepted, and different pieces of channel information corresponding to the respective channels on which the registration message sent from the OLT is intercepted and a unique piece of ONU identification information configured to the ONU by the OLT; or, combined information consisting of a unique piece of serial number information of the ONU itself and different pieces of channel information corresponding to the respective channels on which the registration message sent from the OLT is intercepted, and different pieces of ONU identification information corresponding to the respective channels configured by the OLT; or, combined information consisting of different pieces of channel information corresponding to the respective channels themselves on which the registration message sent from the OLT is intercepted and different pieces of serial number information corresponding to the different pieces of channel information one by one, and different pieces of ONU identification information corresponding to the respective channels configured by the OLT or a unique piece of ONU identification information.

Exemplarily, after sending the message responding to the registration message to the OLT, the ONU receives a ranging result message sent from the OLT, and then the ONU sends a message responding to the ranging result message to the OLT. The message responding to the ranging result message includes combined information consisting of the self-first parameter information and the second parameter information configured by the OLT, the combined information being used for defining a binding relationship for establishing plural channels with the OLT.

Exemplarily, after sending a message responding to the ranging result message to the OLT, the ONU receives a channel capacity message from the OLT, and then sends a message responding to the channel capacity message to the OLT. The message responding to the channel capacity message includes information about channel capacity of the ONU itself.

At step 902, establishment of the channels is completed according to a channel usage command sent from the OLT, the channel usage command including multiple pieces of channel identification information allocated by the OLT.

The ONU completes establishment of the channels according to the channel usage command sent from the OLT, and the channel usage command includes: channel identification information about plural channels that are operable with the OLT normally determined by the OLT according to the message responding to the registration message, or, channel identification information about plural channels that are operable with the OLT normally determined by the OLT according to the message responding to the registration message and the message responding to the channel capacity message. That is, the ONU completes binding of the multiple channels determined by the OLT according to the channel usage command, maintains the optical transceivers corresponding to the plural channels that are operable, and turns off the optical transceivers corresponding to the channels that are not allowed by the OLT to operate.

In the method for establishing channels for a passive optical network provided by the embodiment, the ONU sends, after receiving a registration message sent from an OLT, a message responding to the registration message to the OLT, wherein the message responding to the registration message includes combined information consisting of the self-first parameter information and the second parameter information configured by the OLT, the combined information being used for defining a binding relationship for establishing plural channels with the OLT, and the ONU completes establishment of the channels according to the channel usage command sent from the OLT, the channel usage command including multiple pieces of channel identification information allocated by the OLT. In this way, the OLT obtains plural channels supported by the ONU, and the OLT and the ONU establish plural bound working channels on which the ONU can operate; and when multiple types of ONUs operate in the ODN at the same time, the OLT and the ONU can establish a proper and flexible binding relationship in which the number of bound channels as well as the bound channels can be flexibly changed.

Figure 10:
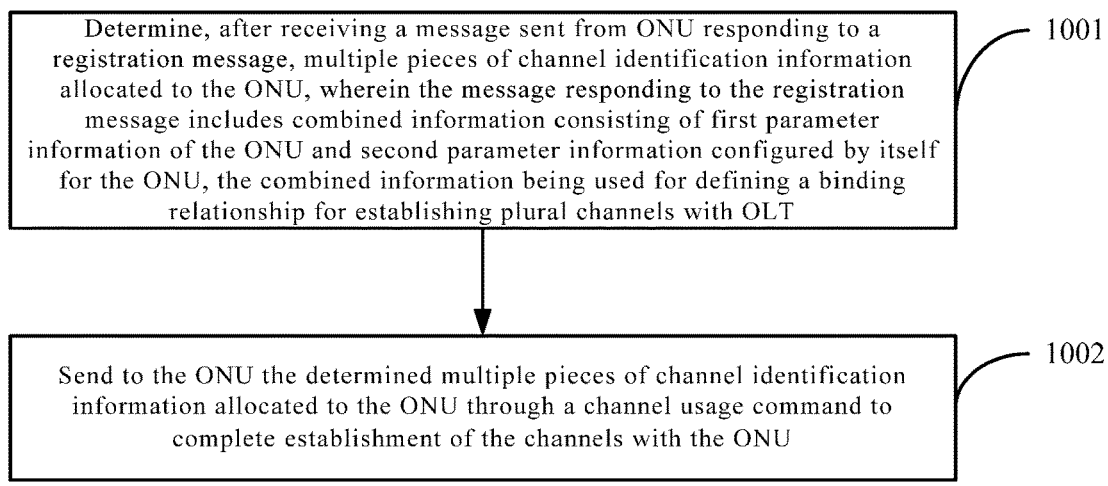
FIG. 10 is a flowchart of another method for establishing channels for a passive optical network according to an embodiment of the present disclosure.

FIG. 10 is a flowchart of another method for establishing channels for a passive optical network according to an embodiment of the present disclosure. As shown in FIG. 10, the method for establishing channels for a passive optical network provided in this embodiment is applied to an OLT. The OLT includes plural ports, each of which corresponding to one wavelength channel. Each channel uses one downlink wavelength and one uplink wavelength and on each channel, one OLT port manages a group of ONUs. The method may include the following steps:

At step 1001, after receiving a message sent from the ONU responding to a registration message, multiple pieces of channel identification information allocated to the ONU are determined. The message responding to the registration message includes combined information consisting of the first parameter information of the ONU and the second parameter information configured by itself for the ONU, the combined information being used for defining a binding relationship for establishing plural channels with the OLT.

Exemplarily, after sending the registration message to the ONU, the OLT first receives a message sent from the ONU responding to a first intercepted registration message. The message responding to the first intercepted registration message includes the first parameter information of the ONU. The first parameter information of the ONU here may include at least one of: different pieces of serial number information corresponding to the respective channels of the ONU having intercepted the registration message sent from the OLT or a unique piece of serial number information; and different pieces of channel information corresponding to the respective channels of the ONU having intercepted the registration message sent from the OLT.

Next, the OLT configures the second parameter information according to the message responding to the first intercepted registration message sent from the ONU, and sends the second parameter information to the ONU. The message responding to the first intercepted registration message includes the first parameter information of the ONU. The second parameter information here may include at least one of: a unique piece of ONU identification information configured by the OLT, and different pieces of ONU identification information corresponding to the respective channels configured by the OLT.

Afterwards, the OLT receives messages respectively responding to all of the intercepted registration messages except the first intercepted registration message, or messages sent from the ONU respectively responding to all of the intercepted registration messages. The messages responding to the registration message include combined information consisting of the first parameter information of the ONU and the second parameter information configured by itself for the ONU, and the combined information is used for defining a binding relationship for establishing plural channels with the ONU. Here, the combined information consisting of the first parameter information of the ONU and the second parameter information configured by itself for the ONU may include information selected from a group consisting of:

combined information consisting of different pieces of serial number information corresponding to the respective channels on which the ONU has intercepted the registration message, and a unique piece of ONU identification information configured by itself to the ONU;

combined information consisting of different pieces of serial number information corresponding to the respective channels on which the ONU has intercepted the registration message; and different pieces of ONU identification information corresponding to the respective channels configured by itself to the ONU and a unique piece of ONU identity information;

combined information consisting of different pieces of serial number information corresponding to the respective channels on which the ONU has intercepted the registration message and different pieces of channel information corresponding to the respective channels on which the ONU has intercepted the registration message; and a unique piece of ONU identification information configured by itself to the ONU;

combined information consisting of a unique piece of serial number information of the ONU and different pieces of channel information corresponding to the respective channels on which the ONU has intercepted the registration message; and different pieces of ONU identification information corresponding to the respective channels configured by itself to the ONU; and combined information consisting of different pieces of channel information corresponding to the respective channels on which the ONU has intercepted the registration message and different pieces of serial number information corresponding to the different pieces of channel information one by one; and different pieces of ONU identification information corresponding to the respective channels configured by itself to the ONU or a unique piece of ONU identification information.

Finally, according to the combined information consisting of the first parameter information of the ONU and the second parameter information configured by itself for the ONU in the messages respectively responding to all of the intercepted registration messages except the first intercepted registration message, or messages respectively responding to all of the intercepted registration messages fed back by the ONU, the OLT may determine channel identification information about plural channels that are operable with the ONU normally, that is, determine on which channels a certain ONU can operate at the same time.

Exemplarily, before determining the multiple pieces of channel identification information allocated to the ONU and after sending a ranging result message to the ONU, the OLT receives a message sent from the ONU responding to the ranging result message. The message responding to the ranging result message includes combined information consisting of the first parameter information of the ONU and the second parameter information configured by itself for the ONU, the combined information being used for defining a binding relationship for establishing plural channels with the OLT.

In addition, the OLT may choose to perform ranging on all channels supported by the ONU at the same time, and send the ranging results to the ONU; or the OLT may also calculate the ranging results of the ONU on other channels, and send the ranging results to the ONU; or the OLT does not choose to perform ranging on the ONU, and the ONU uses the same ranging result on all channels.

Exemplarily, before determining the channel identification information allocated to the ONU and after sending the channel capacity message to the ONU, the OLT receives a message sent from the ONU responding to the channel capacity message, wherein the message responding to the channel capacity message includes information about channel capacity of the ONU.

Exemplarily, the step of the OLT determining the channel identification information allocated to the ONU may include: determining, by the OLT, channel identification information about plural channels that are operable with the ONU normally according to the message responding to the registration message and the message responding to the channel capacity message.

At step 1002, the determined multiple pieces of channel identification information allocated to the ONU are sent to the ONU through a channel usage command, and establishment of the channels with the ONU is completed.

The OLT sends to the ONU the determined multiple pieces of channel identification information allocated to the ONU through a channel usage command, and completes establishment of the channels with the ONU. That is, the OLT uses the channel usage command to complete binding of multiple channels between the ONU and the OLT, and command the ONU to maintain the optical transceivers corresponding to plural operable channels and turn off the transceivers corresponding to the working channels that are not allowed to operate.

In the method for establishing channels for a passive optical network provided by the embodiment, after receiving a message sent from the ONU responding to a registration message, the OLT determines multiple pieces of channel identification information allocated to the ONU, wherein the message responding to the registration message includes combined information consisting of the first parameter information of the ONU and the second parameter information configured by itself for the ONU, and the combined information is used for defining a binding relationship for establishing plural channels with the ONU; and the OLT sends to the ONU the determined multiple pieces of channel identification information allocated to the ONU through a channel usage command to complete establishment of channels with the ONU. In this way, the OLT obtains plural channels supported by the ONU, and the OLT and the ONU establish plural bound working channels on which the ONU can operate; and when multiple types of ONUs operate in the ODN at the same time, the OLT and the ONU can establish a proper and flexible binding relationship in which the number of bound channels as well as the bound channels can be flexibly changed.

Figure 11:
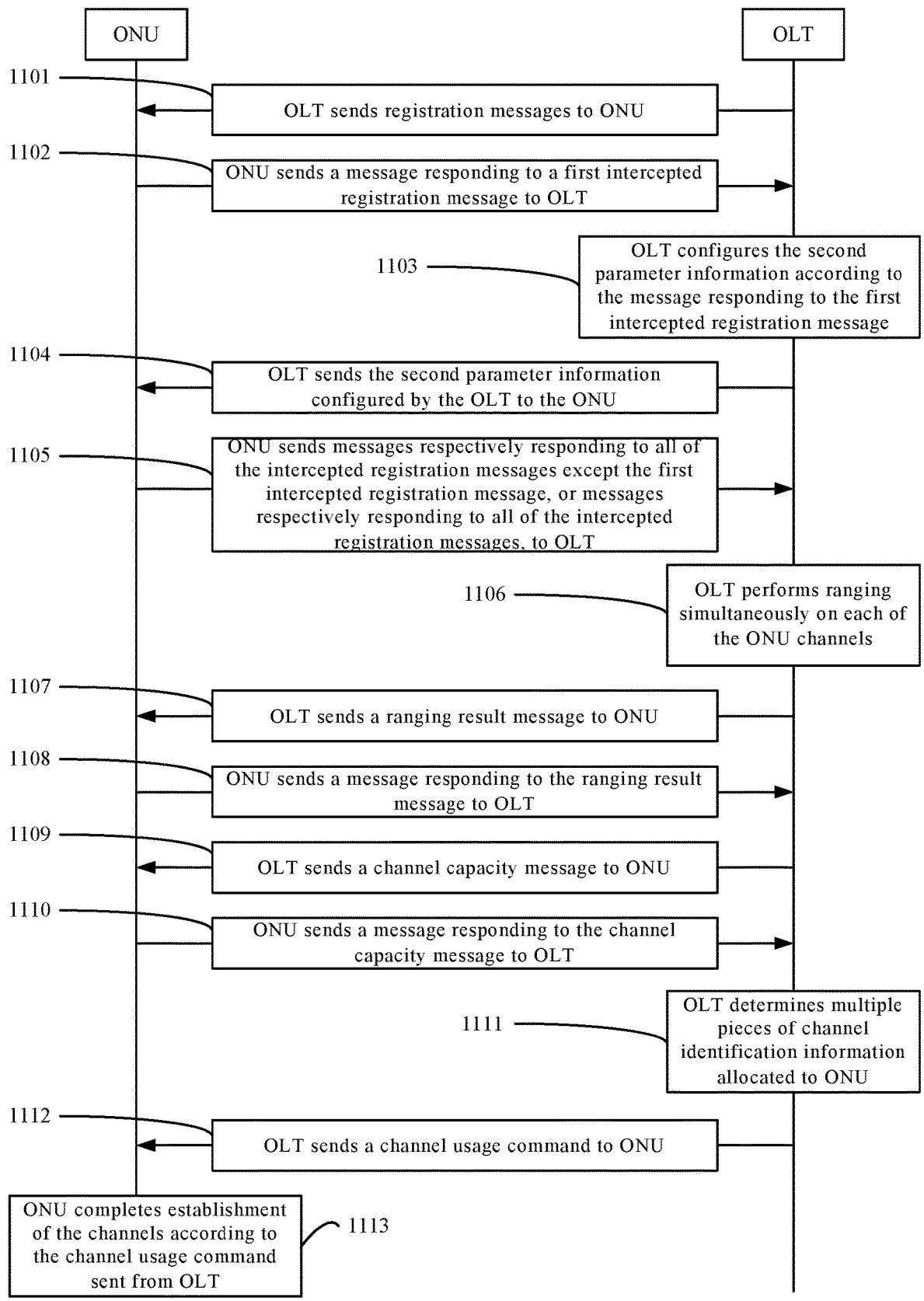
FIG. 11 is an exemplary flowchart of a method for establishing channels for a passive optical network according to an embodiment of the present disclosure.

FIG. 11 is an exemplary flowchart of a method for establishing channels for a passive optical network according to an embodiment of the present disclosure. As shown in FIG. 11, the method for establishing channels for a passive optical network provided in this embodiment is applied to an interaction between the ONU and the OLT. The OLT includes plural ports, each of which corresponding to one channel. Each channel uses one downlink wavelength and one uplink wavelength and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural channels simultaneously. The method may include the following steps 1101-1113:

At step 1101, the OLT sends registration messages to the ONU.

The OLT sends registration messages to the ONU, and the ONU receives (intercepts) the registration messages sent from the OLT.

At step 1102, the ONU sends a message responding to a first intercepted registration message to the OLT.

The ONU sends a message responding to the first intercepted registration message to the OLT; and the OLT receives a message sent from the ONU responding to the first intercepted registration message. The message responding to the first intercepted registration message includes the first parameter information of the ONU itself. For explanation of the first parameter information of the ONU itself, reference may be made to the foregoing embodiments, and details are not repeated herein.

At step 1103, the OLT configures the second parameter information according to the message responding to the first intercepted registration message.

For explanation of the second parameter information configured by the OLT here, reference may be made to the foregoing embodiments, and details are not repeated herein.

At step 1104, the OLT sends the second parameter information configured by the OLT to the ONU.

The OLT sends the second parameter information configured by the OLT to the ONU, and the ONU receives the second parameter information configured and sent from the OLT.

At step 1105, the ONU sends messages respectively responding to all of the intercepted registration messages except the first intercepted registration message, or messages respectively responding to all of the intercepted registration messages, to the OLT.

The ONU sends messages respectively responding to all of the intercepted registration messages except the first intercepted registration message, or messages respectively responding to all of the intercepted registration messages, to the OLT, and the OLT receives, from the ONU, the messages respectively responding to all of the intercepted registration messages except the first intercepted registration message, or the messages responding to all of the intercepted registration messages. The messages responding to the registration messages include combined information consisting of the first parameter information of the ONU and the second parameter information configured for the ONU by the OLT itself, and the combined information is used for defining a binding relationship for establishing plural channels between the OLT and the ONU. For explanation of the combined information consisting of the first parameter information of the ONU and the second parameter information configured for the ONU by the OLT itself, reference may be made to the above embodiments, and details are not repeated herein.

At step 1106, the OLT performs ranging simultaneously on each of the ONU channels.

The OLT performs ranging simultaneously on each of the ONU channels that sents the registration responding message, and obtains the ranging result of each channel.

At step 1107, the OLT sends the ranging result message to the ONU.

The OLT carries the ranging results in the ranging result message and sends the ranging result message to the ONU, and the ONU receives the ranging result message sent from the OLT carrying the ranging results.

At step 1108, the ONU sends a message responding to the ranging result message to the OLT.

The ONU sends a message responding to the ranging result message to the OLT, and the OLT receives the message sent from the ONU responding to the ranging result message. The message responding the ranging result message carries the combined information consisting of the first parameter information of the ONU and the second parameter information configured for the ONU by the OLT itself in step 1105.

At step 1109, the OLT sends a channel capacity message to the ONU.

The OLT sends a channel capacity message to the ONU, and the ONU receives the channel capacity message sent from the OLT. The channel capacity message is used to obtain a channel capacity of the ONU, the channel capacity being information about one or more channels on which the ONU is capable of sending and receiving data. Each piece of channel information includes information about an uplink wavelength and information about a downlink wavelength.

At step 1110, the ONU sends a message responding to the channel capacity message to the OLT.

The ONU sends a message responding to the channel capacity message to the OLT, and the OLT receives the message sent from the ONU responding to the channel capacity message. The message responding to the channel capacity message includes the information about channel capacity of the ONU itself.

At step 1111, the OLT determines multiple pieces of channel identification information allocated to the ONU.

According to the combined information consisting of the first parameter information of the ONU and the second parameter information configured for the ONU by the OLT itself in the messages respectively responding to all of the intercepted registration messages except the first intercepted registration message, or in the messages responding to all of the intercepted registration messages, the OLT determines multiple pieces of channel identification information allocated to the ONU, that is, determines plural channels that are operable with the ONU normally. Alternatively, according to the messages respectively responding to all of the intercepted registration messages except the first intercepted registration message, or messages responding to all of the intercepted registration messages, as well as the message responding to the channel capacity message, sent from the ONU, the OLT determines pieces of channel identification information allocated to the ONU, that is, determines channels that are operable with the ONU normally.

At step 1112, the OLT sends a channel usage command to the ONU.

The OLT sends, through the channel usage command, the multiple channels that are determined to be operable with the ONU normally to the ONU, and the ONU receives the channel usage command sent from the OLT.

At step 1113, the ONU completes establishment of the channels according to the channel usage command sent from the OLT.

The ONU completes binding of the multiple channels determined with the OLT according to the channel usage command, maintains the optical transceivers corresponding to the multiple channels that are operable, and turns off the optical transceivers corresponding to the channels that are not allowed by the OLT to operate.

In the method for establishing channels for a passive optical network provided by the embodiment, the OLT obtains plural channels supported by the ONU, and the OLT and the ONU establish plural bound working channels on which the ONU can operate; and when multiple types of ONUs operate in the ODN at the same time, the OLT and the ONU can establish a proper and flexible binding relationship in which the number of bound channels as well as the bound channels can be flexibly changed.

Plural scenarios are exemplarily explained below.

Scenario IV

In this scenario, the OLT includes plural ports, each of which corresponding to one wavelength channel. Each channel uses one downlink wavelength and one uplink wavelength, and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously. Each of the ONUs that support binding of multiple channels stores multiple pieces of serial number information, and each of the channels corresponds to a unique serial number, i.e., has a piece of serial number information different from each other.

The OLT and the ONU establish binding channels by the following steps:

At step 1 of Scenario IV: in the current PON system, the ONU turns on optical receivers of all channels supported by the ONU to intercept downlink registration messages; and turns on an optical transmitter corresponding to the channel on which the registration message is first intercepted, to send a registration responding message. The registration responding message includes serial number information of the ONU on the channel on which the registration message is first intercepted.

At step 2 of Scenario IV: the OLT receives the registration responding message sent from the ONU in step 1 of Scenario IV, extracts the serial number information of the ONU, and allocates a currently unique piece of ONU identification information in the current PON system to the ONU.

At step 3 of Scenario IV: the ONU stores the unique piece of ONU identification information allocated to the ONU by the OLT. The ONU continues to intercept downlink registration messages on other supported wavelength channels, and turns on optical transmitters corresponding to the channels on which a registration message is intercepted, to send a registration responding message. The registration responding message includes serial number information of the ONU in the current PON system, and the unique piece of ONU identification information allocated to the ONU by the OLT in step 2 of Scenario IV.

At step 4 of Scenario IV: the OLT performs ranging simultaneously on each of the ONU channels that sents a registration responding message, and sends the ranging result of each channel to the ONU on the corresponding channels. The ranging result of each channel includes the unique piece of ONU identification information allocated to the ONU by the OLT in step 2 of Scenario IV.

At step 5 of Scenario IV: according to the same unique piece of ONU identification information allocated to the ONU by the OLT in the registration responding messages or ranging responding messages sent from the ONU on different channels, the OLT may associate different channels of ONU with the same ONU, and obtain channel information about all channels supported by the ONU. The OLT sends to the ONU a channel usage command including information about on which wavelength channels the ONU can operate determined by the OLT, and notifies the ONU on which wavelength channels it can operate at the same time.

At step 6 of Scenario IV: after receiving the channel usage command sent from the OLT in step 5 of Scenario IV, the ONU completes binding of wavelengths according to the operable wavelength channels indicated in the channel usage command, maintains the optical transceivers of the operable working channels, and turns off the optical transceivers on the working channels that are not allowed to operate.

Scenario V

In this scenario, the OLT includes plural ports, each of which corresponding to one wavelength channel. Each channel uses one downlink wavelength and one uplink wavelength, and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously. Each of the ONUs that support binding of multiple channels stores multiple pieces of serial number information, and each of the channels corresponds to a unique serial number, i.e., has a piece of serial number information different from each other.

The OLT and the ONU establish binding channels by the following steps:

At step 1 of Scenario V: in the current PON system, the ONU turns on optical receivers of all channels supported by the ONU to intercept downlink registration messages; and turns on an optical transmitter corresponding to the channel on which the registration message is first intercepted, to send a registration responding message. The registration responding message includes serial number information of the ONU on the channel on which the registration message is first intercepted.

At step 2 of Scenario V: the OLT receives the registration responding message sent from the ONU in step 1 of scenario V, extracts the serial number information of the ONU, and allocates an ONU identification information of the current channel in the current PON system and a unique piece of ONU identity information to the ONU.

At step 3 of Scenario V: the ONU stores the ONU identification information of the current channel and the unique piece of ONU identity information allocated to the ONU by the OLT. The ONU continues to intercept downlink registration messages on other supported wavelength channels, and turns on optical transmitters corresponding to the channels on which a registration message is intercepted, to send a registration responding message. The registration responding message includes serial number information of the ONU in the current PON system, and the unique piece of ONU identity information allocated to the ONU by the OLT in step 2 of Scenario V.

At step 4 of Scenario V: the OLT simultaneously performs ranging on each of the ONU channels that sents a registration responding message, and sends the ranging result of each channel to the ONU on the corresponding channels. The responding message of the ranging result of each channel includes the unique piece of ONU identity information allocated to the ONU by the OLT in step 2 of Scenario V.

At step 5 of Scenario V: according to the same unique piece of ONU identity information allocated to the ONU by the OLT in the registration responding messages sent from the ONU on different channels, the OLT may associate different channels of ONU with the same ONU, and obtain channel information about all channels supported by the ONU. The OLT sends to the ONU a channel usage command including information about on which wavelength channels the ONU can operate determined by the OLT, and notifies the ONU on which wavelength channels it can operate at the same time.

At step 6 of Scenario V: after receiving the channel usage command sent from the OLT in step 5 of scenario V, the ONU completes binding of wavelengths according to the operable wavelength channels indicated in the channel usage command, maintains the optical transceivers of the operable working channels, and turns off the optical transceivers on the working channels that are not allowed to operate.

Scenario VI

In this scenario, the OLT includes plural ports, each of which corresponding to one wavelength channel. Each channel uses one downlink wavelength and one uplink wavelength and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously.

The OLT and the ONU establish binding channels by the following steps:

At step 1 of Scenario VI: in the current PON system, the ONU turns on optical receivers of all channels supported by the ONU to intercept downlink registration messages; and turns on an optical transmitter corresponding to the channel on which the registration message is first intercepted, to send a registration responding message. The registration responding message includes serial number information and channel information about all channels supported by the ONU. The channel information includes one or more pieces of wavelength channel information about the capacity of the ONU sending and receiving data. Each piece of wavelength channel information includes information about an uplink wavelength and information about a downlink wavelength.

At step 2 of Scenario VI: the OLT receives the registration responding message sent from the ONU in step 1 of Scenario VI, extracts the serial number information and the channel information about all channels supported by the ONU, and allocates a unique piece of ONU identification information in the current PON system to the ONU.

At step 3 of Scenario VI: the OLT simultaneously performs ranging to the ONU on each of the channels supported by both the ONU and the OLT, and sends the ranging result of each channel to the ONU on the corresponding channels, or sends all of the ranging results including the ranging result corresponding to each of the channels to the ONU through a registered channel.

At step 4 of Scenario VI: according to the serial number information of the ONU and the channel information about all supported channels reported by the ONU, the OLT obtains the channel information about all channels supported by the ONU, and sends a message to the ONU to notify on which wavelength channels the ONU can operate at the same time.

At step 5 of Scenario VI: after receiving a channel usage command sent from the OLT in step 4 of Scenario VI including information about on which wavelength channels the ONU can operate determined by the OLT, the ONU completes binding of wavelengths according to the operable wavelength channels indicated in the channel usage command, maintains the optical transceivers of the operable working channels, and turns off the optical transceivers on the working channels that are not allowed to operate.

Scenario VII

In this scenario, the OLT includes plural ports, each of which corresponding to one wavelength channel. Each channel uses one downlink wavelength and one uplink wavelength and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously.

The OLT and the ONU establish binding channels by the following steps:

At step 1 of Scenario VII: in the current PON system, the ONU turns on optical receivers of all channels supported by the ONU to intercept downlink registration messages; and turns on an optical transmitter corresponding to the channel on which the registration message is first intercepted, to send a registration responding message. The registration responding message includes a unique piece of serial number information and channel information about all channels supported by the ONU. The channel information includes one or more pieces of wavelength channel information about the capacity of the ONU sending and receiving data. Each piece of wavelength channel information includes information about an uplink wavelength and information about a downlink wavelength.

At step 2 of Scenario VII: the OLT receives the registration responding message sent from the ONU in step 1 of Scenario VII, extracts the unique piece of serial number information and the channel information about all channels supported by the ONU, and sends an allocated ONU identification information to the ONU. The ONU identification information includes respective pieces of ONU identification information of the ONU on all supported wavelength channels, and on different channels, the ONU is allocated by the OLT with different pieces of ONU identification information.

At step 3 of Scenario VII: the OLT simultaneously performs ranging of the ONU on each of the channels supported by the ONU, and sends the ranging result of each channel to the ONU on the corresponding channels.

At step 4 of Scenario VII: according to the channel information about all supported channels and the unique piece of serial number information reported by the ONU, the OLT may associate different channels of ONU with the same ONU, and obtain channel information about all channels supported by the ONU. The OLT sends to the ONU a channel usage command including information about on which wavelength channels the ONU can operate determined by the OLT, and notifies the ONU on which wavelength channels it can operate at the same time.

At step 5 of Scenario VII: after receiving the channel usage command sent from the OLT in step 4 of Scenario VII, the ONU completes binding of wavelengths according to the operable wavelength channels indicated in the channel usage command, maintains the optical transceivers of the operable working channels, and turns off the optical transceivers on the working channels that are not allowed to operate.

Scenario VIII

In this scenario, the OLT includes plural ports, each of which corresponding to one wavelength channel. Each channel uses one downlink wavelength and one uplink wavelength and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously.

The OLT and the ONU establish binding channels by the following steps:

At step 1 of Scenario VIII: in the current PON system, the ONU turns on optical receivers of all channels supported by the ONU to intercept downlink registration messages; and turns on an optical transmitter corresponding to the channel on which the registration message is first intercepted, to send a registration responding message. The registration responding message includes serial number information of the ONU.

At step 2 of Scenario VIII: the OLT receives the registration responding message sent from the ONU in step 1 of Scenario VIII, extracts the serial number information of the ONU, and allocates a unique piece of ONU identification information in the current PON system to the ONU.

At step 3 of Scenario VIII: the OLT inquiries a wavelength channel capacity of the ONU.

At step 4 of Scenario VIII: the ONU replies channel information about all its supported wavelength channels to the OLT. The wavelength channel capacity is information about one or more wavelength channels on which the ONU is capable of sending and receiving data. Each piece of wavelength channel information includes information about an uplink wavelength and information about a downlink wavelength.

At step 5 of Scenario VIII: according to the channel information about all supported channels and the same unique piece of ONU identification information allocated to the ONU by the OLT reported by the ONU, the OLT may associate different channels of ONU with the same ONU, and obtain channel information about all channels supported by the ONU. The OLT sends to the ONU a channel usage command including information about on which wavelength channels the ONU can operate determined by the OLT, and notifies the ONU on which wavelength channels it can operate at the same time.

At step 6 of Scenario VIII: after receiving the channel usage command sent from the OLT in step 4 of Scenario VIII, the ONU completes binding of wavelengths according to the operable wavelength channels indicated in the channel usage command, maintains the optical transceivers of the operable working channels, and turns off the optical transceivers on the working channels that are not allowed to operate.

Scenario IX

In this scenario, the OLT includes plural ports, each of which corresponding to one wavelength channel. Each channel uses one downlink wavelength and one uplink wavelength and on each channel, one OLT port manages a group of ONUs. The group of ONUs transmit uplink data in a time division multiplexing access mode, and different groups of ONUs on different wavelength channels transmit data in a wavelength division multiplexing mode. One ONU can support data transmission and reception on plural wavelength channels simultaneously. Multiple pieces of serial number information are stored at one ONU, and each channel corresponds to one piece of serial number information.

The OLT and the ONU establish binding channels by the following steps:

At step 1 of Scenario IX: in the current PON system, the ONU turns on optical receivers of all channels supported by the ONU to intercept downlink registration messages; and turns on an optical transmitter corresponding to the channel on which the registration message is first intercepted, to send a registration responding message. The registration responding message includes channel information about all channels supported by the ONU and corresponding serial number information. Different channels correspond to different pieces of serial number information.

At step 2 of Scenario IX: the OLT receives the registration responding message sent from the ONU in step 1 of Scenario IX, extracts the channel information about all channels supported by the ONU and the corresponding serial number information, and obtains the channel information about all channels supported by the ONU. The OLT allocates the ONU identification information in the current PON system to the ONU.

The OLT may choose to allocate only one piece of ONU identification information to all channels of the ONU in the entire PON system, or may choose to allocate one piece of ONU identification information to the ONU on each of the channels, where different channels correspond to different ONU identification information.

At step 3 of Scenario IX: according to the channel information about all channels supported by the ONU, the OLT performs ranging simultaneously on all channels supported by the ONU, and sends the ranging results to the ONU.

The OLT may choose to perform ranging on all supported channels, and send the ranging results to the ONU; or the OLT may also calculate the ranging results of the ONU on other channels, and send the ranging results to the ONU; or the OLT does not choose to perform ranging on the ONU, and the ONU uses the same ranging result on all channels.

At step 4 of Scenario IX: according to the channel information about all channels supported by the ONU and the corresponding serial number information, the OLT may associate different channels of ONU with the same ONU, and obtain channel information about all channels supported by the ONU, and determine on which wavelength channels the ONU can operate at the same time. The OLT sends to the ONU a channel usage command including information about on which wavelength channels the ONU can operate determined by the OLT, and notifies the ONU on which wavelength channels it can operate at the same time.

At step 5 of Scenario IX: after receiving the channel usage command sent from the OLT in step 4 of Scenario IX, the ONU completes binding of wavelengths according to the operable wavelength channels indicated in the channel usage command, maintains the optical transceivers of the operable working channels, and turns off the optical transceivers on the working channels that are not allowed to operate.

Figure 12:
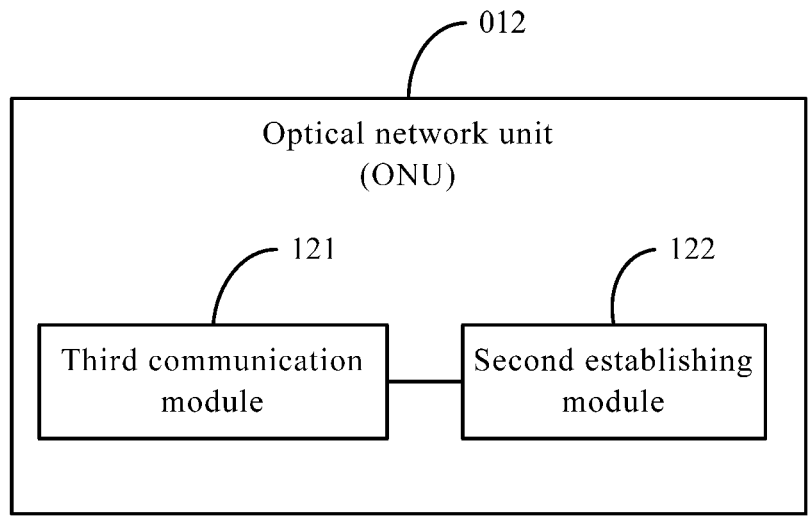
FIG. 12 is a schematic structural diagram of another optical network unit according to an embodiment of the present disclosure.

FIG. 12 is a schematic structural diagram of another optical network unit according to an embodiment of the present disclosure. As shown in FIG. 12, an ONU 012 is provided in this embodiment, including: a third communication module 121, and a second establishing module 122; wherein the third communication module 121 is configured to send, after receiving a registration message sent from an optical line terminal (OLT), a message responding to the registration message to the OLT, wherein the message responding to the registration message includes combined information consisting of the self-first parameter information and the second parameter information configured by the OLT, the combined information being used for defining a binding relationship for establishing plural channels with the OLT; and the second establishing module 122 is configured to complete establishment of the channels according to a channel usage command sent from the OLT, wherein the channel usage command includes multiple pieces of channel identification information allocated by the OLT.

Exemplarily, the self-first parameter information and the second parameter information configured by the OLT may include information selected from a group consisting of:

different pieces of serial number information corresponding to the respective channels on which the registration message sent from the OLT is intercepted; and a unique piece of ONU identification information configured by the OLT;

different pieces of serial number information corresponding to the respective channels on which the registration message sent from the OLT is intercepted; and different pieces of ONU identification information corresponding to the respective channels configured by the OLT and a unique piece of ONU identity information;

different pieces of serial number information corresponding to the respective channels on which the registration message sent from the OLT is intercepted and different pieces of channel information corresponding to the respective channels on which the registration message sent from the OLT is intercepted; and a unique piece of ONU identification information configured by the OLT;

a unique piece of serial number information, different pieces of channel information corresponding to the respective channels on which the registration message sent from the OLT is intercepted; and different pieces of ONU identification information corresponding to the respective channels configured by the OLT; and different pieces of channel information corresponding to the respective channels on which the registration message sent from the OLT is intercepted and different pieces of serial number information corresponding to the different pieces of channel information one by one; and different pieces of ONU identification information corresponding to the respective channels configured by the OLT or a unique piece of ONU identification information.

Exemplarily, the third communication module 121 may be further configured to send a message responding to a first intercepted registration message to the OLT; and receive the second parameter information sent from the OLT; wherein the second parameter information is configured by the OLT according to the message responding to the first intercepted registration message, and the message responding to the first intercepted registration message includes the self-first parameter information.

The third communication module 121 may be configured to send messages respectively responding to all of the intercepted registration messages except the first intercepted registration message, or messages respectively responding to all of the intercepted registration messages, to the OLT.

Exemplarily, the third communication module 121 may be further configured to send, after receiving a ranging result message sent from the OLT, a message responding to the ranging result message to the OLT. The message responding to the ranging result message includes combined information consisting of the self-first parameter information and the second parameter information configured by the OLT, the combined information being used for defining a binding relationship for establishing plural channels with the OLT.

Exemplarily, the third communication module 121 may be further configured to send, after receiving a channel capacity message sent from the OLT, a message responding to the channel capacity message to the OLT. The message responding to the channel capacity message includes information about self-channel capacity.

Exemplarily, the channel usage command includes: channel identification information about plural channels that are operable with the OLT normally, the channel identification information being determined by the OLT according to the message responding to the registration message and the message responding to the channel capacity message.

The ONU of this embodiment may be used to implement the technical solution of the method embodiment as shown in FIG. 9. The implementation principle and technical effects are similar and details are not repeated herein again.

In practical applications, each of the third communication module 121 and the second establishing module 122 may be implemented by a central processing unit (CPU), a micro processor unit (MPU), a digital signal processor (DSP) or a field programmable gate array (FPGA) in the ONU or the like.

Figure 13:
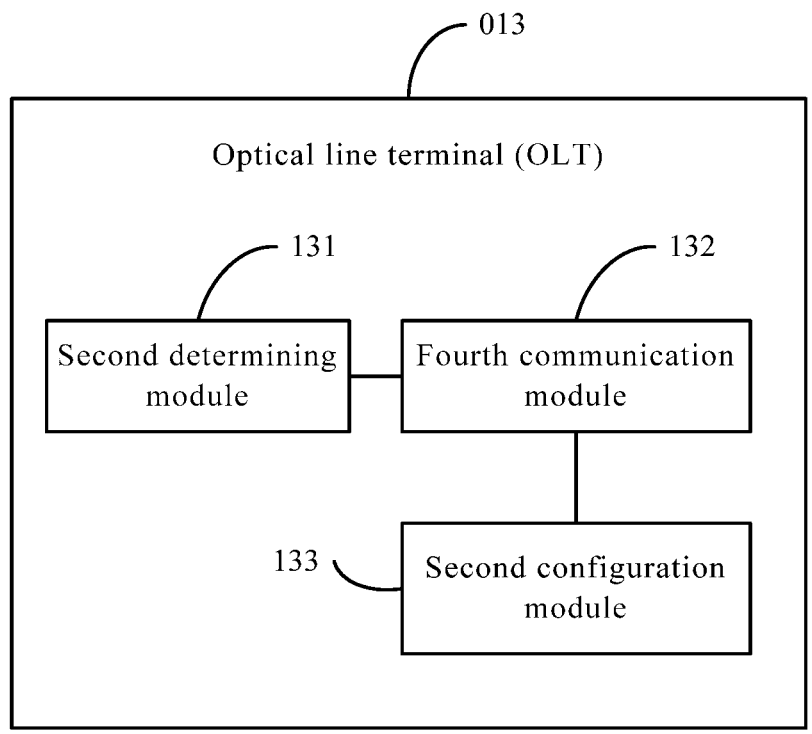
FIG. 13 is a schematic structural diagram of another optical line terminal according to an embodiment of the present disclosure.

FIG. 13 is a schematic structural diagram of another optical line terminal according to an embodiment of the present disclosure. As shown in FIG. 13, an OLT 013 is provided in this embodiment, including: a second determining module 131, and a fourth communication module 132; wherein the second determining module 131 is configured to determine, after receiving a message sent from an optical network unit (ONU) responding to a registration message, multiple pieces of channel identification information allocated to the ONU; wherein the message responding to the registration message includes combined information consisting of the first parameter information of the ONU and the second parameter information configured by itself for the ONU, the combined information being used for defining a binding relationship for establishing plural channels with the OLT; and the fourth communication module 132 is configured to send to the ONU the determined multiple pieces of channel identification information allocated to the ONU through a channel usage command, and completing establishment of the channels with the ONU.

Exemplarily, the first parameter information of the ONU and the second parameter information configured by itself for the ONU may include information selected from a group consisting of:

different pieces of serial number information corresponding to the respective channels on which the ONU has intercepted the registration message; and a unique piece of ONU identification information configured by itself to the ONU;

different pieces of serial number information corresponding to the respective channels on which the ONU has intercepted the registration message; and different pieces of ONU identification information corresponding to the respective channels configured by itself to the ONU and a unique piece of ONU identity information;

different pieces of serial number information corresponding to the respective channels on which the ONU has intercepted the registration message and different pieces of channel information corresponding to the respective channels on which the ONU has intercepted the registration message; and a unique piece of ONU identification information configured by itself to the ONU;

a unique piece of serial number information of the ONU and different pieces of channel information corresponding to the respective channels on which the ONU has intercepted the registration message; and different pieces of ONU identification information corresponding to the respective channels configured by itself to the ONU; and different pieces of channel information corresponding to the respective channels on which the ONU has intercepted the registration message and different pieces of serial number information corresponding to the different pieces of channel information one by one; and different pieces of ONU identification information corresponding to the respective channels configured by itself to the ONU or a unique piece of ONU identification information.

Exemplarily, the fourth communication module 132 may be further configured to receive a message sent from the ONU responding to a first intercepted registration message; and the OLT 013 may further include: a second configuration module 133; wherein the second configuration module 133 is configured to configure the second parameter information according to the message responding to the first intercepted registration message sent from the ONU; wherein the message responding to the first intercepted registration message includes the first parameter information of the ONU;

the fourth communication module 132 may be further configured to send the second parameter information to the ONU;

the fourth communication module 132 may be further configured to receive messages respectively responding to all of the intercepted registration messages except the first intercepted registration message, or messages sent from the ONU respectively responding to all of the intercepted registration messages.

Exemplarily, the fourth communication module 132 may be further configured to receive, after sending a ranging result message to the ONU, a message sent from the ONU responding to the ranging result message. The message responding to the ranging result message includes combined information consisting of the first parameter information of the ONU and the second parameter information configured by itself for the ONU, the combined information being used for defining a binding relationship for establishing plural channels with the OLT.

Exemplarily, the fourth communication module 132 may be further configured to receive, after sending a channel capacity message to the ONU, a message sent from the ONU responding to the channel capacity message. The message responding to the channel capacity message includes information about channel capacity of the ONU.

Exemplarily, the second determining module 131 may be further configured to determine channel identification information about plural channels that are operable with the ONU normally according to the message responding to the registration message and the message responding to the channel capacity message.

The OLT of this embodiment may be used to implement the technical solution of the method embodiment as shown in FIG. 10. The implementation principle and technical effects are similar and details are not repeated herein again.

In practical applications, all of the second determining module 131, the fourth communication module 132 and the second configuration module 133 may be implemented by a central processing unit (CPU), a micro processor unit (MPU), a digital signal processor (DSP) or a field programmable gate array (FPGA) in the OLT or the like.

Figure 14:
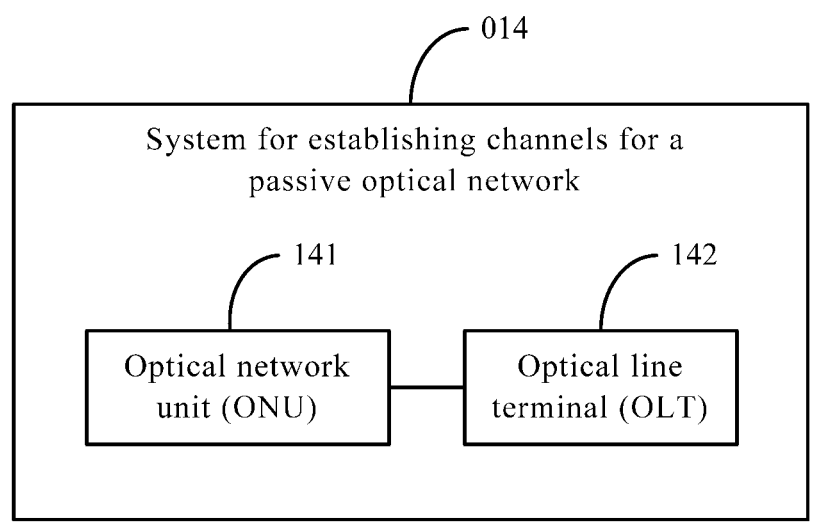
FIG. 14 is a schematic structural diagram of another system for establishing channels for a passive optical network according to an embodiment of the present disclosure.

FIG. 14 is a schematic structural diagram of another system for establishing channels for a passive optical network according to an embodiment of the present disclosure. As shown in FIG. 14, a system 014 for establishing channels for a passive optical network is provided in this embodiment, including an ONU 141 and an OLT 142; wherein the ONU 141 may adopt an ONU in the embodiment shown in FIG. 12; and the OLT 142 may adopt an OLT in the embodiment shown in FIG. 13.

In addition, in an embodiment of the present application, a computer readable medium storing a channel establishment program for a PON is further provided. When executed by a processor, the channel establishment program implements steps of the method for establishing channels for a PON according to any one of the above embodiments.

Those skilled in the art will appreciate that embodiments of the present application can be provided as a method, a system, or a computer program product. Accordingly, the present application may take the form of a hardware embodiment, a software embodiment, or a combination of software and hardware. Moreover, the present application may take the form of a computer program product embodied on one or more computer-usable storage media (including but not limited to disk storage and optical storage, etc.) including computer usable program code.

The present application has been described with reference to flowcharts and/or block diagrams of the methods, apparatus (systems), and computer program products according to the embodiments of the present application. It should be understood that each flow and/or block in the flowcharts and/or block diagrams, as well as any combination thereof, may be implemented by computer program instructions. These computer program instructions may be provided to a general purpose computer, a special purpose computer, an embedded processor, or a processor of other programmable data processing apparatus, such that the instructions, which execute via the processor of the computer or other programmable data processing apparatus, create means for implementing the functions specified in one or more flows of the flowchart and/or one or more blocks of the block diagram.

These computer program instructions may also be stored in a computer readable memory that can direct a computer or other programmable data processing apparatus to operate in a particular manner, such that the instructions stored in the computer readable memory produce an article of manufacture including an instruction means for implementing the functions specified in one or more flows of the flowchart and/or one or more blocks of the block diagram.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in one or more flows of the flowchart and/or one or more blocks of the block diagram.

Those of ordinary skill in the art will appreciate that all or some steps of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or step may be performed cooperatively by several physical components. Some or all components may be implemented as software executed by a processor, such as a digital signal processor or microprocessor, or implemented as hardware, or implemented as an integrated circuit, such as an application specific integrated circuit. Such software may be distributed on a computer readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those skilled in the art that communication medium typically includes a computer readable instruction, a data structure, a program module, or other data in a modulated data signal, such as a carrier wave or other transport mechanism, and may include any information delivery medium.

The above are only exemplary embodiments of the present application and not intended to limit the scope of the present application.

INDUSTRIAL APPLICABILITY

Embodiments of the present application provide a PON channel establishment method, a ONU, a OLT, and a system, which achieves that the OLT obtains plural channels supported by the ONU, and the OLT and the ONU establish plural bound working channels on which the ONU can operate; and when multiple types of ONUs operate in the ODN at the same time, the OLT and the ONU can establish a proper and flexible binding relationship in which the number of bound channels as well as the bound channels can be flexibly changed.

What is claimed is:

1. A method for establishing channels for a passive optical network (PON), the method being applied to an optical network unit (ONU) side, and comprising:
    sending, after receiving a registration message sent from an optical line terminal (OLT), a message responding to the registration message to the OLT, wherein the message responding to the registration message comprises first parameter information for defining self-uniqueness, and the first parameter information for defining self-uniqueness is used for defining a binding relationship for establishing plural channels with the OLT; and
    completing establishment of the channels according to a channel usage command sent from the OLT, wherein the channel usage command comprises multiple pieces of channel identification information allocated by the OLT,
    wherein before completing establishment of the channels according to the channel usage command sent from the OLT, the method further comprises: sending, after receiving a channel capacity message sent from the OLT, a message responding to the channel capacity message to the OLT, wherein the message responding to the channel capacity message comprises information about self-channel capacity, and wherein the channel capacity message is used to obtain a channel capacity of the ONU, the channel capacity being information about one or more channels on which the ONU is capable of sending and receiving data, wherein
        after sending the message responding to the registration message to the OLT and before the multiple pieces of channel identification information allocated to the ONU are determined by the OLT, the method further comprises: sending, after receiving a ranging result message sent from the OLT, a message responding to the ranging result message to the OLT; wherein the message responding to the ranging result message comprises the first parameter information for defining self-uniqueness, or,
        the channel usage command comprises: channel identification information about plural channels that are operable with the OLT normally, the channel identification information being determined by the OLT according to the message responding to the registration message and the message responding to the channel capacity message.

2. The method according to claim 1, wherein the first parameter information for defining self-uniqueness comprises information selected from a group consisting of:
    a unique piece of ONU identity information;
    a unique piece of serial number information;
    different pieces of serial number information corresponding to the respective channels on which the registration message sent from the OLT is intercepted, and a unique piece of ONU identity information; and
    a unique piece of serial number information, and different pieces of channel information corresponding to the respective channels on which the registration message sent from the OLT is intercepted.

3. The method according to claim 1, wherein the step of sending the message responding to the registration message to the OLT comprises: sending messages respectively responding to all of the intercepted registration messages to the OLT; and
    after sending the message responding to the registration message to the OLT, the method further comprises:
    receiving second parameter information sent from the OLT, the second parameter information comprising ONU identification information; wherein the second parameter information comprising the ONU identification information is configured by the OLT according to the messages respectively responding to all of the intercepted registration messages, and the messages respectively responding to all of the intercepted registration messages comprise the first parameter information for defining self-uniqueness.

4. A method for establishing channels for a passive optical network (PON), the method being applied to an optical line terminal (OLT) side, and comprising:
    determining, after receiving a message sent from an optical network unit (ONU) responding to a registration message, multiple pieces of channel identification information allocated to the ONU; wherein the message responding to the registration message comprises first parameter information for determining uniqueness of the ONU, and the first parameter information for determining uniqueness of the ONU is used for defining a binding relationship for establishing plural channels with the OLT; and
    sending to the ONU the determined multiple pieces of channel identification information allocated to the ONU through a channel usage command to complete establishment of the plural channels with the ONU,
    wherein before determining the multiple pieces of channel identification information allocated to the ONU, the method further comprises: receiving, after sending a channel capacity message to the ONU, a message sent from the ONU responding to the channel capacity message; wherein the message responding to the channel capacity message comprises information about channel capacity of the ONU, the channel capacity being information about one or more channels on which the ONU is capable of sending and receiving data, wherein before determining the multiple pieces of channel identification information allocated to the ONU, the method further comprises: receiving, after sending a ranging result message to the ONU, a message sent from the ONU responding to the ranging result message; wherein the message responding to the ranging result message comprises the first parameter information for determining uniqueness of the ONU, or, the step of determining multiple pieces of channel identification information allocated to the ONU comprises: determining channel identification information about plural channels that are operable with the ONU normally according to the message responding to the registration message and the message responding to the channel capacity message.

5. The method according to claim 4, wherein the first parameter information for determining uniqueness of the ONU comprises information selected from a group consisting of:

a unique piece of ONU identity information;

a unique piece of serial number information;

different pieces of serial number information corresponding to the respective channels on which the registration message is intercepted by the ONU and a unique piece of ONU identity information; and a unique piece of serial number information, and different pieces of channel information corresponding to the respective channels on which the registration message is intercepted by the ONU.

6. The method according to claim 4, wherein the step of receiving the message sent from the ONU responding to the registration message comprises:

receiving messages sent from the ONU respectively responding to all of the intercepted registration messages; and configuring second parameter information according to the messages sent from the ONU respectively responding to all of the intercepted registration messages, the second parameter information comprising ONU identification information; wherein the messages respectively responding to all of the intercepted registration messages comprise the first parameter information for determining uniqueness of the ONU.

7. A method for establishing channels for a passive optical network (PON), the method being applied to an optical network unit (ONU) side, and comprising:

sending, after receiving a registration message sent from an optical line terminal (OLT), a message responding to the registration message to the OLT, wherein the message responding to the registration message comprises combined information consisting of self-first parameter information and second parameter information configured by the OLT, the combined information being used for defining a binding relationship for establishing plural channels with the OLT;

completing establishment of the channels according to a channel usage command sent from the OLT, wherein the channel usage command comprises multiple pieces of channel identification information allocated by the OLT, wherein before completing establishment of the channels according to the channel usage command sent from the OLT, the method further comprises: sending, after receiving a channel capacity message sent from the OLT, a message responding to the channel capacity message to the OLT; wherein the message responding to the channel capacity message comprises information about self-channel capacity, and wherein the channel capacity message is used to obtain a channel capacity of the ONU, the channel capacity being information about one or more channels on which the ONU is capable of sending and receiving data, wherein the self-first parameter information and the second parameter information configured by the OLT comprise information selected from a group consisting of:

different pieces of serial number information corresponding to the respective channels on which the registration message sent from the OLT is intercepted; and a unique piece of ONU identification information configured by the OLT;

different pieces of serial number information corresponding to the respective channels on which the registration message sent from the OLT is intercepted; and different pieces of ONU identification information corresponding to the respective channels configured by the OLT and a unique piece of ONU identity information;

different pieces of serial number information corresponding to the respective channels on which the registration message sent from the OLT is intercepted and different pieces of channel information corresponding to the respective channels on which the registration message sent from the OLT is intercepted; and a unique piece of ONU identification information configured by the OLT;

a unique piece of serial number information and different pieces of channel information corresponding to the respective channels on which the registration message sent from the OLT is intercepted; and different pieces of ONU identification information corresponding to the respective channels configured by the OLT; and different pieces of channel information corresponding to the respective channels on which the registration message sent from the OLT is intercepted and different pieces of serial number information corresponding to the different pieces of channel information one by one; and different pieces of ONU identification information corresponding to the respective channels configured by the OLT or a unique piece of ONU identification information.

8. The method according to claim 7, wherein before sending the message responding to the registration message to the OLT, the method further comprises:

sending a message responding to a first intercepted registration message to the OLT; and receiving the second parameter information sent from the OLT; wherein the second parameter information is configured by the OLT according to the message responding to the first intercepted registration message, and the message responding to the first intercepted registration message comprises the self-first parameter information;

wherein the step of sending the message responding to the registration message to the OLT comprises:

sending messages respectively responding to all of the intercepted registration messages except the first intercepted registration message, or messages respectively responding to all of the intercepted registration messages, to the OLT.

9. The method according to claim 7, wherein
after sending the message responding to the registration message to the OLT, the method further comprises: sending, after receiving a ranging result message sent from the OLT, a message responding to the ranging result message to the OLT; wherein the message responding to the ranging result message comprises combined information consisting of the self-first parameter information and the second parameter information configured by the OLT, the combined information being used for defining a binding relationship for establishing plural channels with the OLT, or,
the channel usage command comprises: channel identification information about plural channels that are operable with the OLT normally, the channel identification information being determined by the OLT according to the message responding to the registration message and the message responding to the channel capacity message.

10. A method for establishing channels for a passive optical network (PON), the method being applied to an optical line terminal (OLT) side, and comprising:
determining, after receiving a message sent from an optical network unit (ONU) responding to a registration message, multiple pieces of channel identification information allocated to the ONU; wherein the message responding to the registration message comprises combined information consisting of first parameter information of the ONU and second parameter information configured by itself for the ONU, the combined information being used for defining a binding relationship for establishing plural channels with the OLT;
sending to the ONU the determined multiple pieces of channel identification information allocated to the ONU through a channel usage command, and completing establishment of the channels with the ONU,
wherein before determining the multiple pieces of channel identification information allocated to the ONU, the method further comprises: receiving, after sending a channel capacity message to the ONU, a message sent from the ONU responding to the channel capacity message; wherein the message responding to the channel capacity message comprises information about channel capacity of the ONU, the channel capacity being information about one or more channels on which the ONU is capable of sending and receiving data,
wherein the first parameter information of the ONU and the second parameter information configured by itself for the ONU comprise information selected from a group consisting of:
different pieces of serial number information corresponding to the respective channels on which the ONU has intercepted the registration message; and a unique piece of ONU identification information configured by itself to the ONU;
different pieces of serial number information corresponding to the respective channels on which the ONU has intercepted the registration message; and different pieces of ONU identification information corresponding to the respective channels configured by itself to the ONU and a unique piece of ONU identity information;
different pieces of serial number information corresponding to the respective channels on which the ONU has intercepted the registration message and different pieces of channel information corresponding to the respective channels on which the ONU has intercepted the registration message; and a unique piece of ONU identification information configured by itself to the ONU;
a unique piece of serial number information of the ONU and different pieces of channel information corresponding to the respective channels on which the ONU has intercepted the registration message; and different pieces of ONU identification information corresponding to the respective channels configured by itself to the ONU; and
different pieces of channel information corresponding to the respective channels on which the ONU has intercepted the registration message and different pieces of serial number information corresponding to the different pieces of channel information one by one; and different pieces of ONU identification information corresponding to the respective channels configured by itself to the ONU or a unique piece of ONU identification information.

11. The method according to claim 10, wherein before receiving the message sent from the ONU responding to the registration message, the method further comprises:
receiving a message sent from the ONU responding to a first intercepted registration message; and
configuring the second parameter information according to the message responding to the first intercepted registration message sent from the ONU; wherein the message responding to the first intercepted registration message comprises the first parameter information of the ONU;
sending the second parameter information to the ONU;
wherein the step of receiving the message sent from the ONU responding to the registration message comprises:
receiving messages respectively responding to all of the intercepted registration messages except the first intercepted registration message, or messages sent from the ONU respectively responding to all of the intercepted registration messages.

12. The method according to claim 10, wherein
before determining the multiple pieces of channel identification information allocated to the ONU, the method further comprises: receiving, after sending a ranging result message to the ONU, a message sent from the ONU responding to the ranging result message; wherein the message responding to the ranging result message comprises combined information consisting of the first parameter information of the ONU and the second parameter information configured by itself for the ONU, the combined information being used for defining a binding relationship for establishing plural channels with the OLT, or,
the step of determining multiple pieces of channel identification information allocated to the ONU comprises: determining channel identification information about plural channels that are operable with the ONU normally according to the message responding to the registration message and the message responding to the channel capacity message.

* * * * *